(12) United States Patent
Rode et al.

(10) Patent No.: US 11,225,022 B2
(45) Date of Patent: Jan. 18, 2022

(54) BUILD MATERIAL DISPENSING DEVICE

(71) Applicant: HEWLETT-PACKARD DEVELOPMENT COMPANY, L.P., Spring, TX (US)

(72) Inventors: Mike Rode, Vancouver, WA (US); John Geile, Vancouver, WA (US); Pierre J. Kaiser, Vancouver, WA (US); Wesley R. Schalk, Vancouver, WA (US); Arthur H. Barnes, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/608,430

(22) PCT Filed: Jan. 25, 2018

(86) PCT No.: PCT/US2018/015147
§ 371 (c)(1),
(2) Date: Oct. 25, 2019

(87) PCT Pub. No.: WO2019/147239
PCT Pub. Date: Aug. 1, 2019

(65) Prior Publication Data
US 2020/0346408 A1 Nov. 5, 2020

(51) Int. Cl.
*B29C 64/329* (2017.01)
*B33Y 10/00* (2015.01)
(Continued)

(52) U.S. Cl.
CPC .......... *B29C 64/329* (2017.08); *B29C 64/214* (2017.08); *B29C 64/218* (2017.08);
(Continued)

(58) Field of Classification Search
CPC ... B29C 64/307; B29C 64/329; B29C 64/321; B29C 64/336; B29C 64/343; B29C 64/214; B29C 64/218; B29C 64/00–393
See application file for complete search history.

(56) References Cited

U.S. PATENT DOCUMENTS

| 5,934,343 A | 8/1999 | Gaylo et al. |
| 2007/0282477 A1 | 12/2007 | Schmidt |

(Continued)

FOREIGN PATENT DOCUMENTS

| BE | 825242 A | 5/1975 |
| CN | 103738747 A | 4/2014 |

(Continued)

OTHER PUBLICATIONS

"Metal 3D Printing at Scale"; printed from website on Dec. 12, 2017; https://www.desktopmetal.com/products/production.
(Continued)

*Primary Examiner* — Mary Lynn F Theisen
(74) *Attorney, Agent, or Firm* — Fabian VanCott

(57) ABSTRACT

A build material dispensing device may include a material spreader to spread an amount of build material along a build platform, and at least one hopper for dispensing the build material. The at least one hopper dispenses a plurality of doses of the build material in front of the progression of the material spreader as the material spreader is moved over the build platform.

20 Claims, 17 Drawing Sheets

(51) Int. Cl.
*B33Y 30/00* (2015.01)
*B33Y 40/00* (2020.01)
*B29C 64/214* (2017.01)
*B29C 64/255* (2017.01)
*B29C 64/295* (2017.01)
*B29C 64/218* (2017.01)
*B29C 64/307* (2017.01)
*B29C 64/336* (2017.01)

(52) U.S. Cl.
CPC .......... *B29C 64/255* (2017.08); *B29C 64/295* (2017.08); *B29C 64/307* (2017.08); *B29C 64/336* (2017.08); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 2015/0057784 A1 | 2/2015 | Butler | |
| 2015/0130101 A1 | 5/2015 | Fiegener | |
| 2015/0139849 A1 | 5/2015 | Pialot et al. | |
| 2015/0258706 A1* | 9/2015 | Okamoto | B29C 64/165 428/413 |
| 2016/0121399 A1 | 5/2016 | Buller et al. | |
| 2017/0008230 A1 | 1/2017 | Yuyama | |
| 2017/0072643 A1 | 3/2017 | Ng | |
| 2017/0341302 A1 | 11/2017 | Hochsmann et al. | |
| 2018/0304367 A1* | 10/2018 | Myerberg | B22F 12/00 |
| 2019/0060998 A1* | 2/2019 | Kelkar | B29C 64/218 |

FOREIGN PATENT DOCUMENTS

| | | |
|---|---|---|
| CN | 104010750 | 8/2014 |
| CN | 204565115 | 8/2015 |
| CN | 107031046 | 8/2017 |
| CN | 109311089 | 2/2019 |
| WO | WO-2013178825 | 12/2013 |
| WO | WO-2016146095 | 9/2016 |
| WO | WO-2016161489 A2 | 11/2016 |
| WO | WO-2017008891 A1 | 1/2017 |
| WO | WO-2017018935 | 2/2017 |
| WO | WO-2017127114 A1 | 7/2017 |
| WO | WO-2017189019 A1 | 11/2017 |
| WO | WO-2018044300 | 3/2018 |

OTHER PUBLICATIONS

Powder Bed Fusion | Additive Manufacturing Research Group Loughborough University, Aug. 20, 2014.

* cited by examiner

BUILD MATERIAL DISPENSING DEVICE

BACKGROUND

Some additive manufacturing systems produce three-dimensional (3D) objects by building up layers of material and combining those layers using adhesives, heat, chemical reactions, and other coupling processes. Some additive manufacturing systems may be referred to as "3D printers." 3D printers and other additive manufacturing systems make it possible to convert a computer aided design (CAD) model or other digital representation of an object into a physical object. Digital data is processed into slices each defining that part of a layer or layers of build material to be formed into the object.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
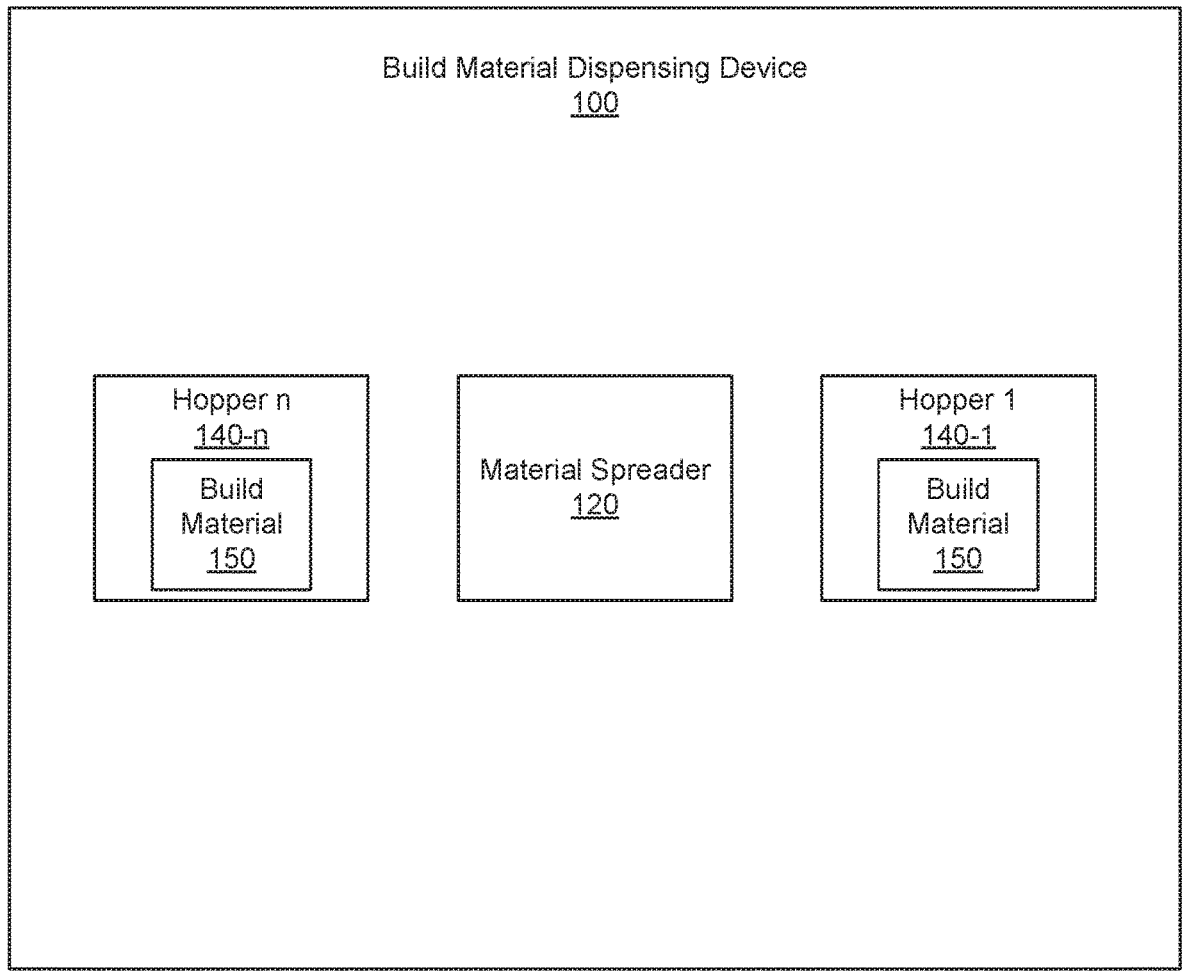
FIG. 1 is a block diagram of a build material dispensing device, according to an example of the principles described herein.
Figure 1:
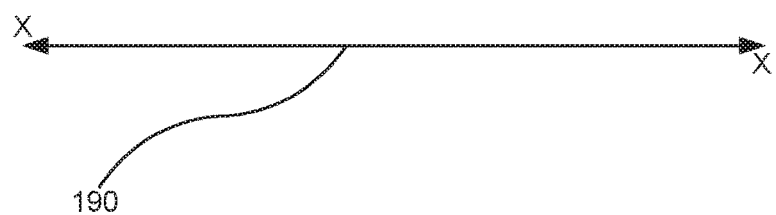

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Some additive manufacturing systems such as three-dimensional (3D) printing systems use build material that have a powdered or granular form. In these examples, the build material may include a semi-crystalline thermoplastic material, metals, plastics, ceramics, glass, composites, resins, graphene-embedded plastics, polymers, photopolymers, thermoplastics, other build materials, and combinations thereof. Different build materials may have different characteristics, such as different average particle sizes, different minimum and maximum particle sizes, different coefficients of friction, different angles of repose, other mechanical and physical properties, and combinations thereof. In other examples non-powdered build materials may be used such as, for example, gels, pastes, and slurries.

Such additive manufacturing systems may provide, along a side of a build platform, a quantity of build material to be spread over the build platform to form a thin layer of build material on the build platform. Portions of the layer of build material may then be solidified, using any suitable solidification technique, such as fusing agent deposition and heating systems, binder agent deposition systems, laser sintering systems, and other binding processes and techniques.

During an additive manufacturing operation, an initial layer of build material may be spread directly on the surface of a build platform, and subsequent layers of build material may be formed on a previously deposited and formed layer of build material. Herein, reference to forming a layer of build material on the build platform may refer, depending on the context, either to forming a layer of build material directly on the surface of the build platform, or to forming a layer of build material on a previously formed layer of build material.

In some additive manufacturing systems, some of the build material may not be uniformly distributed about the build platform. This non-uniformity may lead to poor-quality finished products or parts since the density of the build material is not uniform throughout a spread layer of the build material from the front to back and side to side of a build zone of the build platform, and may be non-uniform as between successive layers of the build material. Further, the temperature of the deposited build material may be non-uniform due to potentially non-uniform distribution of the build material on the build platform.

Further, in some additive manufacturing systems, excessive amounts of build material may be spread across the build platform. This may result in excessive cooling of both the spread material and the 3D object being formed. Cooling of the build material and the 3D object being formed on the build platform may cause successive layers of the 3D object from completely binding with one another, leading to reduced mechanical strength of the 3D object. Cooling of the build material may, in turn, cause warping of the 3D objects leading to multiple failures including dragging of parts across a build platform and poor dimensional control of the 3D objects.

Still further, some additive manufacturing systems use methods of transporting and depositing the build material such as dispensing large amounts of the build material from relatively higher distances from the build platform, or dispensing the build material quickly. This may cause the properties of the build material such as electrostatic charge of and flowability to change resulting in the formation of a poor-quality 3D object. Further, in some additive manufacturing systems, a small volume, number, and types of materials may be transported and precisely metered by a single transport system called a hopper. A hopper is used to dispense an amount of build material along the build platform. With a limited breadth of materials that are able to be transported and precisely metered, the time it may take to form a 3D object may be increased resulting in a lower production rate.

Even still further, in some additive manufacturing systems, a large amount of build material may be deposited on a substrate called a build platform. In one example, the dosing may be performed on a layer-by-layer basis. The system may ensure that enough build material is provided to enable each new layer of build material to be formed. Since an amount of the build material for each layer may not be precisely determined, the system may over dose the amount of build material to ensure that enough build material is provided in order to accommodate all printable objects. In these additive manufacturing systems, a pile of build material may be generated in order to spread the build material to the build platform from one fixed point. This pile of build material may be spread across the build platform and may, in some examples, be spread back across build platform in the opposite direction before a binding process occurs. There are several techniques to capture excess build material including using movable platforms at each side of the build platform that alternate from a down position when the spreader is approaching and an upper position to allow the spreader to screed build material from the top. In these examples, excess build material may be dumped into the lowered build platform after the layer has been spread. The spreader may then travel past the lowered platform and screed more build material on the return trip after the lowered platform is raised. This movement of the build material, however, causes unwanted delays in the formation of the 3D object and may result in the loss of build material above and beyond a desirable over-dosing of build material.

Still further, this movement of the build material as described in the above paragraphs may generate airborne build material within additive manufacturing systems. This airborne build material may pose a safety risk. For example, airborne build materials may pose an explosion risk under certain conditions.

Examples described herein provide a build material dispensing device in an additive manufacturing system. The build material dispensing device may include a material spreader to spread an amount of build material along a build platform, and at least one hopper for dispensing the build material. The at least one hopper dispenses a plurality of doses of the build material in front of the progression of the material spreader as the material spreader is moved over the build platform.

The at least one hopper includes a first hopper for dispensing the build material. The first hopper may be located in front of the material spreader with respect to a least one direction of travel. The at least one hopper may also include a second hopper for dispensing the build material. The second hopper may be located behind the material spreader with respect to at least one direction of travel. The material spreader may include a material spreading roller that counter-rotates such that it rotates in a direction opposite to its movement relative to the build platform. A distance between the material spreading roller and the build platform may be adjustable within a number of layers of dispensed build material, between the layers of dispensed build material, or combinations thereof.

The build material dispensing device may also include a carriage. The carriage may be moveably coupled to the material spreader and the at least one hopper to move the material spreader and the at least one hopper laterally across the build platform.

The at least one hopper may include a plurality of doctor blades coupled to a dispense end of the at least one hopper, and a rotary closer. The rotary doser may include a number of metering pockets defined therein to dispense a metered amount of build material as the rotary doser rotates based on instructions received from a controller. The first hopper and the second hopper may dispense the build material in front of and behind the material spreader in at least one direction of travel. Further, the at least one hopper may include a number of heating elements to heat the build material therein.

Examples described herein provide an additive manufacturing system. The additive manufacturing system may include a carriage, and a build material dispensing device coupled to the carriage. The build material dispensing device may include a material spreader to spread an amount of build material along a surface, and a first hopper for dispensing the build material. The first hopper may be located in front of the material spreader with respect to a least one direction of travel. The build material dispensing device may also include a second hopper for dispensing the build material. The second hopper may be located behind the material spreader with respect to the at least one direction of travel. The first hopper and the second hopper may dispense the build material bidirectionally in front of the progression of the material spreader.

The material spreader may include a material spreading roller that counter-rotates such that it rotates in a direction opposite direction to its movement relative to the surface. A distance between the material spreading roller and the surface may be adjustable within a number of layers of dispensed build material, between the layers of dispensed build material, or combinations thereof.

The additive manufacturing system may also include an agent dispenser to dispense a printable agent on the build material as dispensed by the build material dispensing device. The first hopper and the second hopper may dispense the build material in front of and behind the material spreader in the at least one direction of travel.

The first hopper and the second hopper each include a lid, and the additive manufacturing system may include at least one hopper refilling system. The at least one hopper refilling system may include a bulk build material housing, a preliminary rotary doser, a pre-stage area for storing a volume of the build material as dispensed by the preliminary rotary doser, a lid opener coupled to the at least one hopper refilling system around the pre-stage area, a transfer chute located below the pre-stage area, and a transfer chute lever mechanically coupled to the transfer chute to open the transfer chute when engaged. The lid opener opens the lid of the first hopper and the second hopper using the lid opener when the first hopper and the second hopper are moved with the carriage to engage the transfer chute lever. Engagement of the transfer chute lever opens the transfer chute to dispense the build material within the pre-stage area into the first hopper and the second hopper.

Examples described herein provide a method of supplying build material to an additive manufacturing system. The method may include, with a first build material dispensing hopper, dispensing a volume of build material onto a build platform in front of a material spreading roller with respect to a least one direction of travel during a first pass. The method may include with a second build material dispensing hopper, dispensing a volume of the build material onto the build platform behind the material spreading roller with respect to the a least one direction of travel during the first pass. Also, the method may include, with the material spreading roller, spreading the build material dispensed by the first build material dispensing hopper and the second build material dispensing hopper bidirectionally.

The method may also include, with a warming lamp, warming the build material on each of a number of passes of the material spreading roller over the build platform. The method may include comprising dispensing build material from the first build material dispensing hopper and the second build material dispensing hopper simultaneously.

Figure 2:
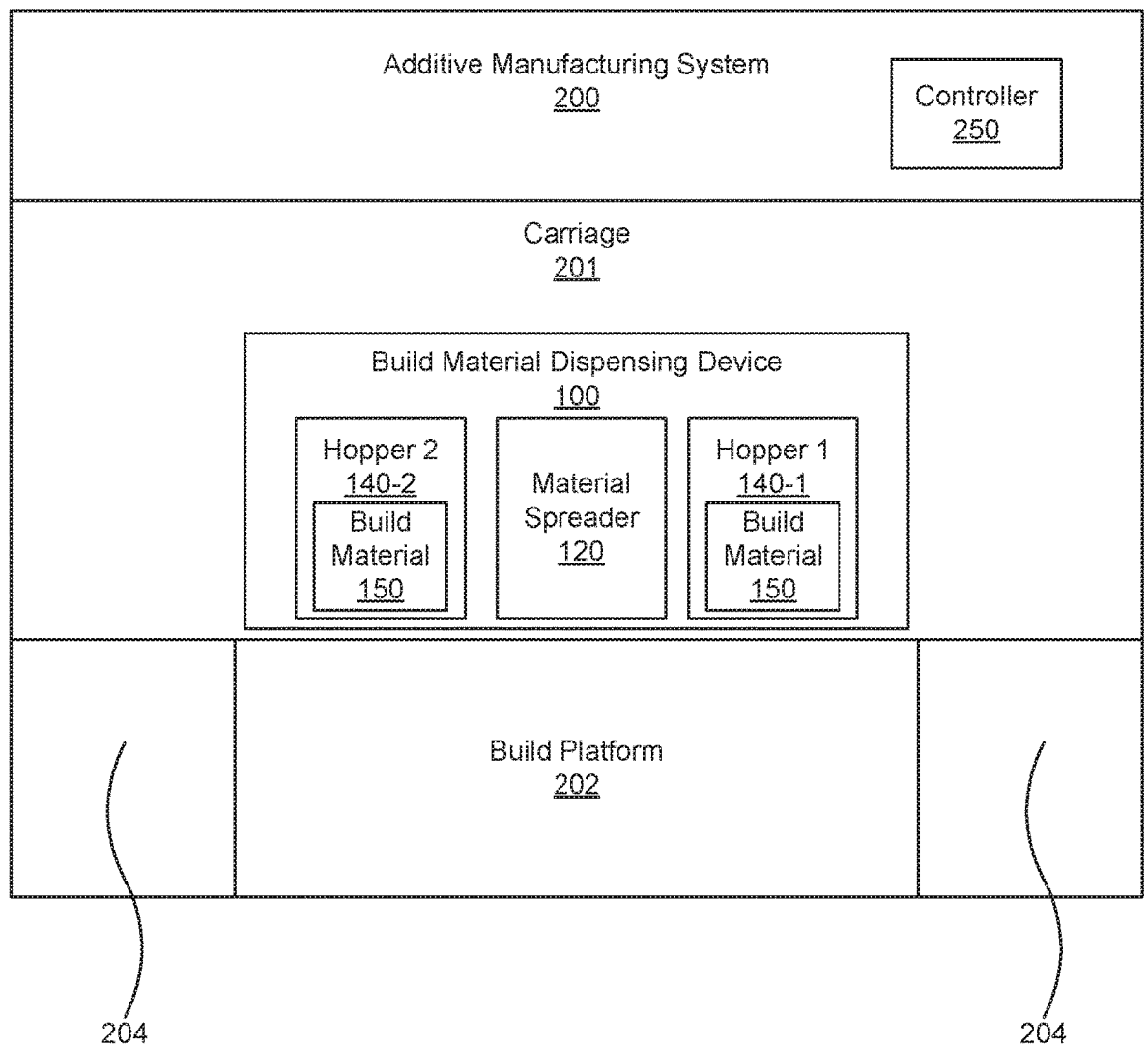
FIG. 2 is a block diagram of an additive manufacturing system, according to an example of the principles described herein.

Turning now to the figures, FIG. 1 is a block diagram of a build material dispensing device (100), according to an example of the principles described herein. The build material dispensing device (100) may be used within an additive manufacturing system (FIG. 2, 200). An additive manufacturing system (FIG. 2, 200) may use any process to form an object by depositing layers of material to create the object. These layer deposition processes may include a powder bed and fusing agent and fusing energy based 3D printing process, selective laser melting (SLM), direct metal laser sintering (DMLS), selective laser sintering (SLS), fused deposition modeling (FDM), stereolithography (SLA), and laminated object manufacturing (LOM), among others. The examples described herein will be described in connection with a powder bed and multi-jet fusion 3D printing process where a layer of build material (150) is spread along the surface of a build platform (202). A fusing or binding agent (herein referred to generally as an agent) may then be selectively deposited by a liquid dispensing device such as, for example, a fluidic die, an inkjet printhead, a thermal inkjet printhead, a piezoelectric inkjet printhead, or other fluid deposition device. A heat source may be used to warm, fuse, and/or cure the build material together at the molecular level by using the agent as a heat catalyst. This process is performed a number of times over a number of build material and agent layers until a 3D object or part is produced. In one example, an additive manufacturing system may use three different categories of agents throughout the print process including a fusing or binding agent to solidify 3D objects, a detailing agent to inhibit solidification or manage temperature, and color agents to color 3D objects.

The build material dispensing device (100) may include a material spreader (120) to spread an amount of the build material (150) along the build platform (FIG. 2, 202). The material spreader (120) may be, for example a roller that spans one planar dimension of the build platform (FIG. 2, 202) to form a level and uniform layer of the build material (150) along the surface of the build platform (FIG. 2, 202). In one example where the material spreader (120) is a roller, the roller may counter-rotate such that the roller rotates in a direction opposite to its movement relative to the build platform (FIG. 2, 202). Throughout this description, the terms "material spreader" and "roller" may be used interchangeably. The present description also refers to doctor blades. A doctor blade is a non-rotating, screeding device that may be used instead of or in addition to a rotating material spreader.

At least one hopper (140-1, 140-n, collectively referred to herein as 140) for dispensing the build material (150) may be included. A hopper (140 may be any device that dispenses an amount of build material for spreading by the material spreader. FIG. 1 depicts two hoppers (140) with one hopper (140-1) positioned in front of the material spreader (120), and another hopper (140-n) positioned behind the material spreader (120) relative to a first direction of travel to the right in the X-direction as indicated by arrow (190). In one example, the hoppers (140) may deposit build material (150) in front of and behind the material spreader (120) as the hoppers (140) and the material spreader (120) translate above and across the build platform (FIG. 2, 202). Thus, the at least one hopper (140) may dispense a plurality of doses of the build material in front of the progression of the material spreader (120) as the material spreader (120) is moved over the build platform (FIG. 2, 202). Although two hoppers (140) are depicted in FIG. 1, any number of hoppers (140) may be included in the build material dispensing device (100) including one hopper (140). In one example, the hoppers (140) may be swappable to allow for different hoppers that contain different build materials to be swapped out and used in the additive manufacturing processes. In this example, the hoppers (140) may be tuned for at least one material they each contain.

In the example where one hopper (140) is included in the build material dispensing device (100), the one hopper (140) may be moved between a front and behind position relative to the movement of the material spreader (120) so that the one hopper (140) may dispense the build material (150) in front of and behind the material spreader (120) relative to the materials spreader's direction of travel across the build platform (FIG. 2, 202). Arrow (190) indicates that the material spreader (120) and the hoppers (140) may move bidirectionally in the X-direction such that material may be dispensed and spread along the build platform (FIG. 2, 202) in two directions of travel, Throughout the specification and figures, the right direction of arrow (190) is the positive x-direction, and the left direction of arrow (190) is the negative x-direction. Further, the up direction of arrow (191) is the positive z-direction, and the down direction of arrow (191) is the negative z-direction.

FIG. 2 is a block diagram of an additive manufacturing system (200), according to an example of the principles described herein. The additive manufacturing system (200) may include the build material dispensing device (100) described herein in connection with FIG. 1. The additive manufacturing system (200) of FIG. 2 may include a build platform (202). The build platform (202) may move in the z-direction indicated by arrow (191) toward and away from the build material dispensing device (100). More specifically, the build platform (202) may move in the downward z-direction as indicated by arrow (191) to allow for successive layers of build material (150) and agent to be deposited at the same level as every other layer of deposited build material (150) and agent. In one example, the build platform (202) may move between 60 and approximately 100 micrometers (μm) in the downward direction between sequential layers of deposited build material (150). As the build material (150) is fused the build material (150) may shrink to approximately half its thickness.

The build material dispensing device (100) including the material spreader (120) and the at least one hopper (140) may be movably coupled to a carriage (201) to move the build material dispensing device (100) in the X-direction indicated by arrow (190). As is described in more detail herein, the build material dispensing device (100) may make a plurality of passes over the build platform (202) dispensing and spreading build material (150) across the build platform (202), and the carriage (201) may be used to move the build material dispensing device (100) in either direction as indicated by arrow (190) as it may be instructed.

In one example, a stage (204) may be included on either side of the build platform (FIG. 2, 202) to allow for build material (150) to be deposited on the stage (204), and spread from the stage (204) to the build platform. In one example, an amount or dose of build material (150) may be deposited on either side of the build platform (202) and on the stage (204), and the material spreader (120) may spread the build material (150) from the stage (204) from either X-direction as indicated by arrow (190). In one example, the hoppers (140) may spread build material (150) over the build platform (202). In one example, excess build material (150) may be staged or deposited on either side of the stage (204) before being spread over the build platform (202) to allow the material spreader (120) to spread this build material (150) in a subsequent pass over the build platform (202) and stage (204).

The additive manufacturing system (200) may also include a controller (250) used to control the functions and movement of the various elements of the additive manufacturing system (200) described herein. For example, the controller (250) may control the movement of the carriage (201) and, in turn, the movement of the build material dispensing device (100) and its elements over the stage (204) and build platform (202). Further, the controller (250) may control the movement of the build platform (202) relative to the stage (204). Still further, the controller (250) may control the quantity of build material (150) deposited by the hoppers (140), the rate of build material (150) deposited by the hoppers (140), the frequency at which the hoppers (140) deposit the build material (150), the timing of the depositions by the hoppers (140), the location along the stage (204) and build platform (202) at which the hoppers (140) deposit the build material (150), other functions of the hoppers (140), and combinations thereof.

FIGS. 3 through 12 are block diagrams of an additive manufacturing system (200) depicting a process performed by the additive manufacturing system (200), according to an example of the principles described herein. The additive manufacturing system (200) of FIGS. 3 through 12 may include the elements described above in connection with FIGS. 1 and 2, and reference to similar elements are described herein in connection with FIGS. 1 and 2. The build platform (202) may be supported by build platform base (203). The build platform (202) and/or the build platform base (203) may be moveably coupled to the stage (204) to allow for the build platform (202) and the build platform base (203) to be moved up and down in order to form layers of the 3D object with the build material (150) and the agent.

As described herein, the material spreader (120) and the hoppers (140) which form the build material dispensing device (100) are moveably coupled to the carriage (201). The carriage (201) traverses a length of the additive manufacturing system (200) so that the build material dispensing device (100) may move over the entirety of the build platform (202). The carriage (201) may include a carriage drive shaft, a carriage coupling device and other devices to couple a material spreader (120), the hoppers (140), an energy emitting device (160), an agent dispenser (180), or combinations thereof. In one example, a plurality of carriages (201) may be included on the build material dispensing device (100) and the additive manufacturing system (200) to move the material spreader (120), the hoppers (140), an energy emitting device (160), and an agent dispenser (180), independently or collectively.

The additive manufacturing system (200) may also include an energy emitting device (160). The energy emitting device (160) is moveably coupled to the carriage (201) and may move along with the build material dispensing device (100) in order to warm the build material (150) and/or fuse, bind, or cure the build material (150). Thus, the energy emitting device (160) may be any device that emits electromagnetic energy at any wavelength to warm or fuse, or cure one or more of the build material (150); an agent; and a combination of build material and agent. In one example, the energy emitting device (160) may include at least one warming lamp (161) that emits electromagnetic energy sufficient to warm the build material (150) deposited or spread along the surface of the stage (204) and the build platform (202). Warming of the build material (150) serves to prepare the build material (150) for solidification including, for example binding or thermal fusing. Further, the electromagnetic radiation from the warming lamp (161) serves to maintain the build material (150) and the object being formed from the build material (150) at a relatively more uniform and non-fluctuating temperature. In the case of thermal binding systems, if the build material (150) and the object being formed are allowed to cool or otherwise fluctuate in temperature, the object or layers thereof may become warped.

The energy emitting device (160) may also include at least one fusing lamp (163). The fusing lamp (163) emits electromagnetic energy sufficient to fuse the build material (150) together through the use of the agent. Fusing of the build material a layer at a time serves to form a 3D object. With the warming lamp (161) warming the build material (150), the fusing lamp (163) may fuse the build material (150) where the agent has been printed and in all coordinate directions within the 3D object including between layers of fused build material (150) by allowing the warming lamp (161) to keep previous, solidified layers at a fusible temperature and fusing the build material (150) spread across the previous, fused layer to fuse to the layer of build material (150) to the previous layer. In one example, the energy emitting device (160) may include one warming lamp (161) and three fusing lamps (163). In one example, the fusing lamps (163) may remain on or activated during a four-pass process described herein. The build material (150), without fusing or agents deposited thereon, may only absorb a small amount of energy from the fusing lamps. In another example, the voltage to the fusing lamps (163) may be lowered when the build platform (202) is being warmed or a fusing or binding process is not being performed in order to reduce power consumption.

The additive manufacturing system (200) may also include an agent dispenser (180) to dispense a binding or fusing agent onto build material (150) spread along the surface of the build platform (202). The agent dispenser (180) may be moveably coupled to the carriage (201), and may move with the build material dispensing device (100) and the energy emitting device (160) over the surface of the build platform. The agent dispenser (180) may include at least one fluidic die (181-1, 181-n, collectively referred to herein as 181) used to dispense a volume of the agent onto the build material (150). In the examples of FIGS. 3 through 12, the agent dispenser (180) includes two fluidic die (181-1, 181-n), but may include any number of fluidic die (181) as denoted by the "n" in 181-n. In one example, the fluidic die (181) may be digitally addressable such that the agent may be dispensed on the build material (150) that is spread across the surface of the build platform (202) in a pattern as defined by object data (322) provided to the additive manufacturing system (200). Wherever the fluidic die (181) of the agent dispenser (180) dispenses agent onto the build material (150) spread across the build platform (202), the fusing lamp (163) will fuse the build material (150) and form a layer of the 3D object.

The additive manufacturing system (200) may also include logic and circuitry to cause the material spreader (120), the hoppers (140), energy emitting device (160), the agent dispenser (180), and the build platform (202) and the build platform base (203) to move and actuate in a manner that produces a 3D object based on object data (322) stored in a data storage device (321) of the additive manufacturing system (200). For example, the additive manufacturing system (200) may include a controller (320). The controller (320) may include the hardware architecture to retrieve executable code from the data storage device (321) and execute the executable code. The executable code may, when executed by the controller (320), cause the controller (320) to implement at least the functionality of sending signals to the material spreader (120), the hoppers (140), energy emitting device (160), the agent dispenser (180), and the build platform (202) and the build platform base (203) to instruct these devices to perform their individual functions according to the methods of the present specification described herein. In the course of executing code, the controller (320) may receive input from and provide output to a number of the remaining hardware units.

The object data (322) stored in the storage device (321) may be obtained from an external source such as, for example, a computer-aided design (CAD) system that provides a CAD model of the 3D object defined by the object data (322). The build layer process (323) may be any data stored in the data storage device (321) that defines the process the controller (320) follows in instructing the material spreader (120), the hoppers (140), energy emitting device (160), the agent dispenser (180), and the build platform (202) and the build platform base (203) to produce the 3D object over a number of build material (150) and agent layers.

As depicted in FIGS. 3 through 12, a first hopper (140-1) for dispensing the build material (150) may be located in front of the material spreader (120) with respect to the positive X-direction indicated by arrow (190). The additive manufacturing system (200) may also include a second hopper located behind the material spreader (120) with respect to the positive X-direction indicated by arrow (190). Thus, a hopper (140) may be located in front of and behind the material spreader (120) irrespective of the direction of travel of the build material dispensing device (100).

The material spreader (120) may include a material spreading roller that counter-rotates such that it rotates in a direction opposite to its movement relative to the build platform. Thus, if the build material dispensing device (100) including the material spreader (120) and the hoppers (140) move in the positive x-direction as indicated by arrow (190), then the roller will rotate in the direction of arrow A. In contrast, if the build material dispensing device (100) including the material spreader (120) and the hoppers (140) move in the negative x-direction as indicated by arrow (190), then the roller will rotate in the direction of arrow B.

In one example, the distance between the material spreading roller (120) and the surfaces of the stage (204) and build platform (202) may be adjustable within a number of layers of dispensed build material (150), between the layers of dispensed build material (150), or combinations thereof. In this manner, the thickness of the layer of build material (150) may be varied. Further, in one example, the distance between the material spreading roller (120) and the surfaces of the stage (204) and build platform (202) may be adjustable to allow the material spreading roller (120) to be lifted from a spreading distance where the build material (150) is spread to a non-contact distance where the material spreading roller (120) does not come in contact with any other element within the additive manufacturing system (200). This allows the material spreading roller (120) to skip or jump over large amounts of build material (150) that may be dispensed by the hoppers (140) on, for example, the stage (204) or the build platform (202).

Figure 11:
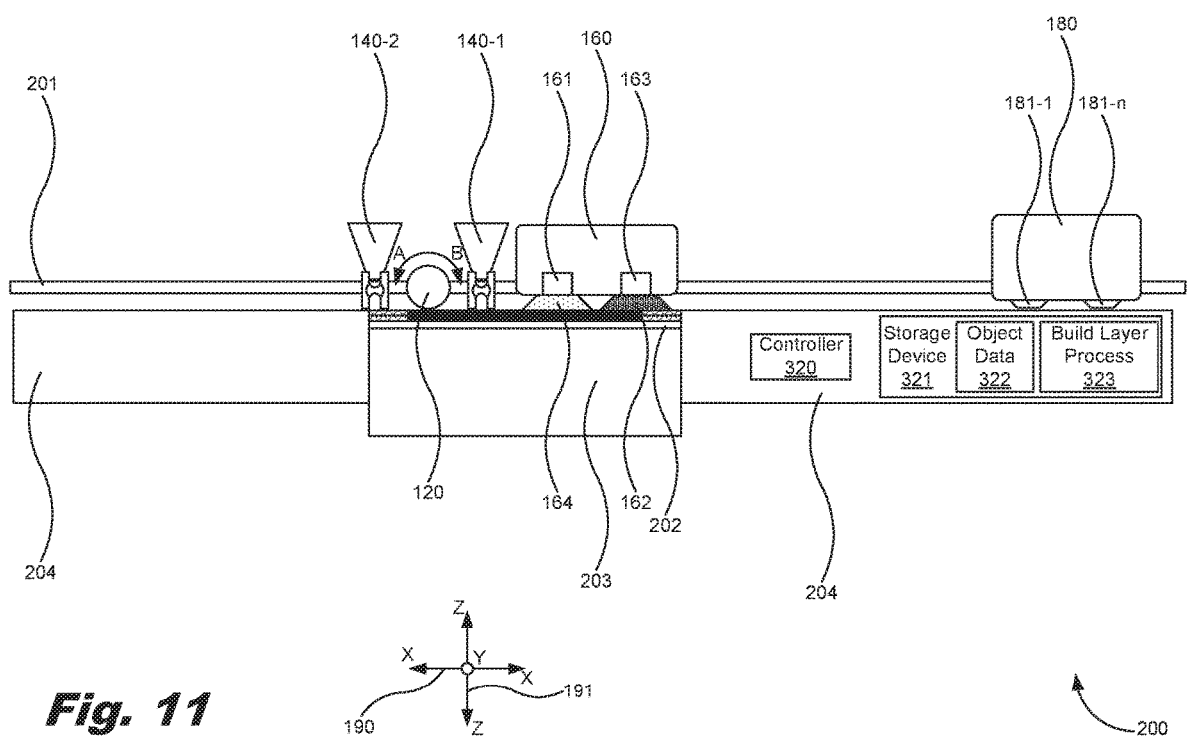
Figure 12:
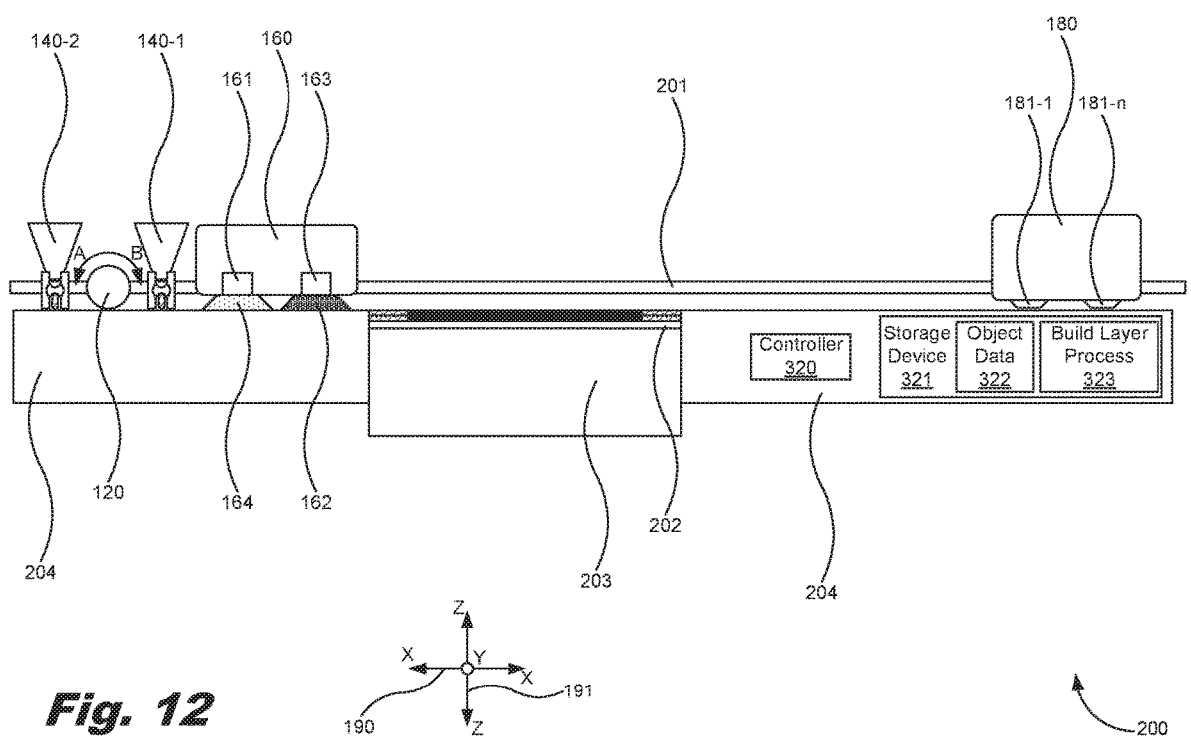
Figure 13:
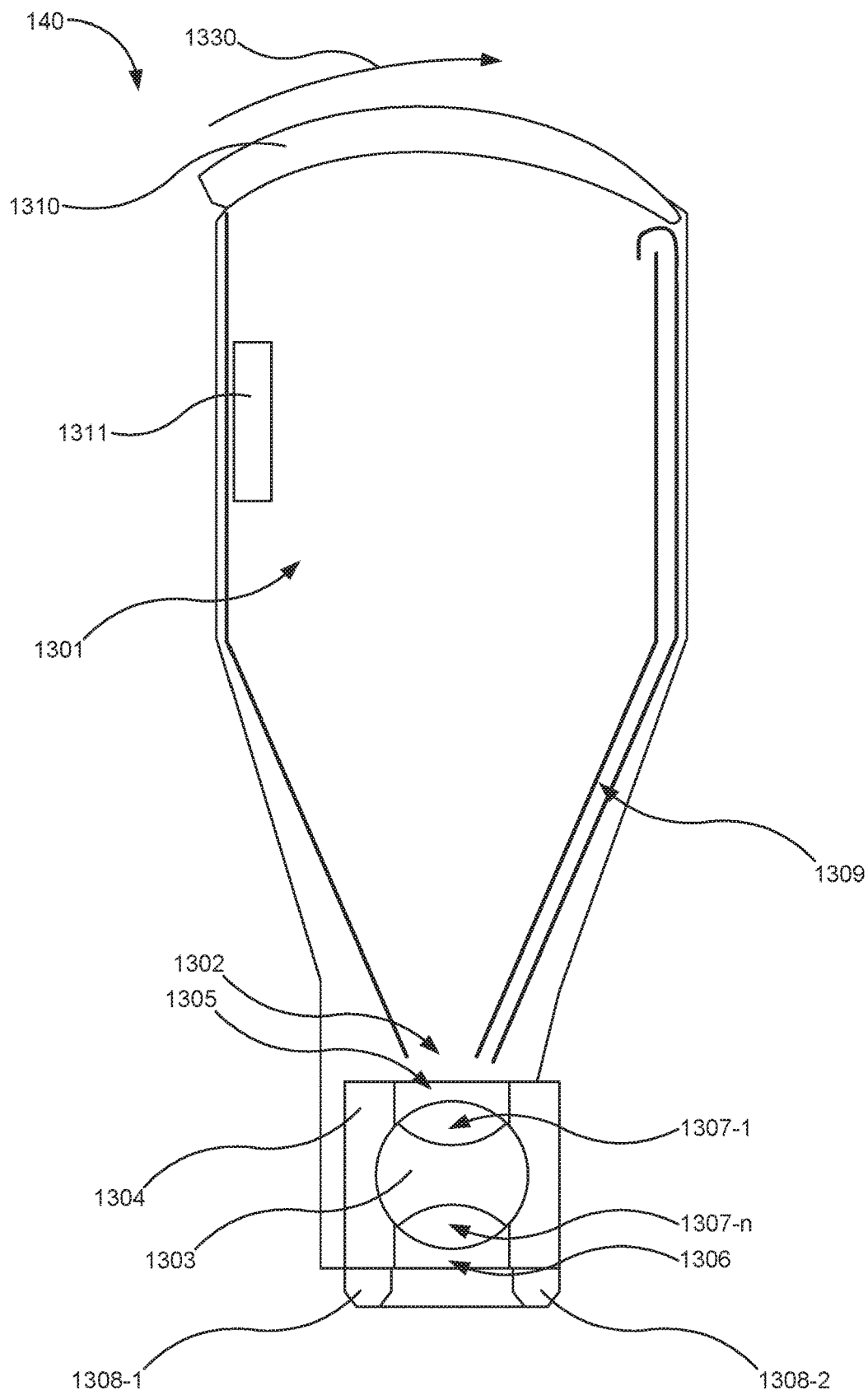
FIG. 13 is a diagram of a hopper to dispense a build material onto a build platform of an additive manufacturing system, according to an example of the principles described herein.
Figure 14:
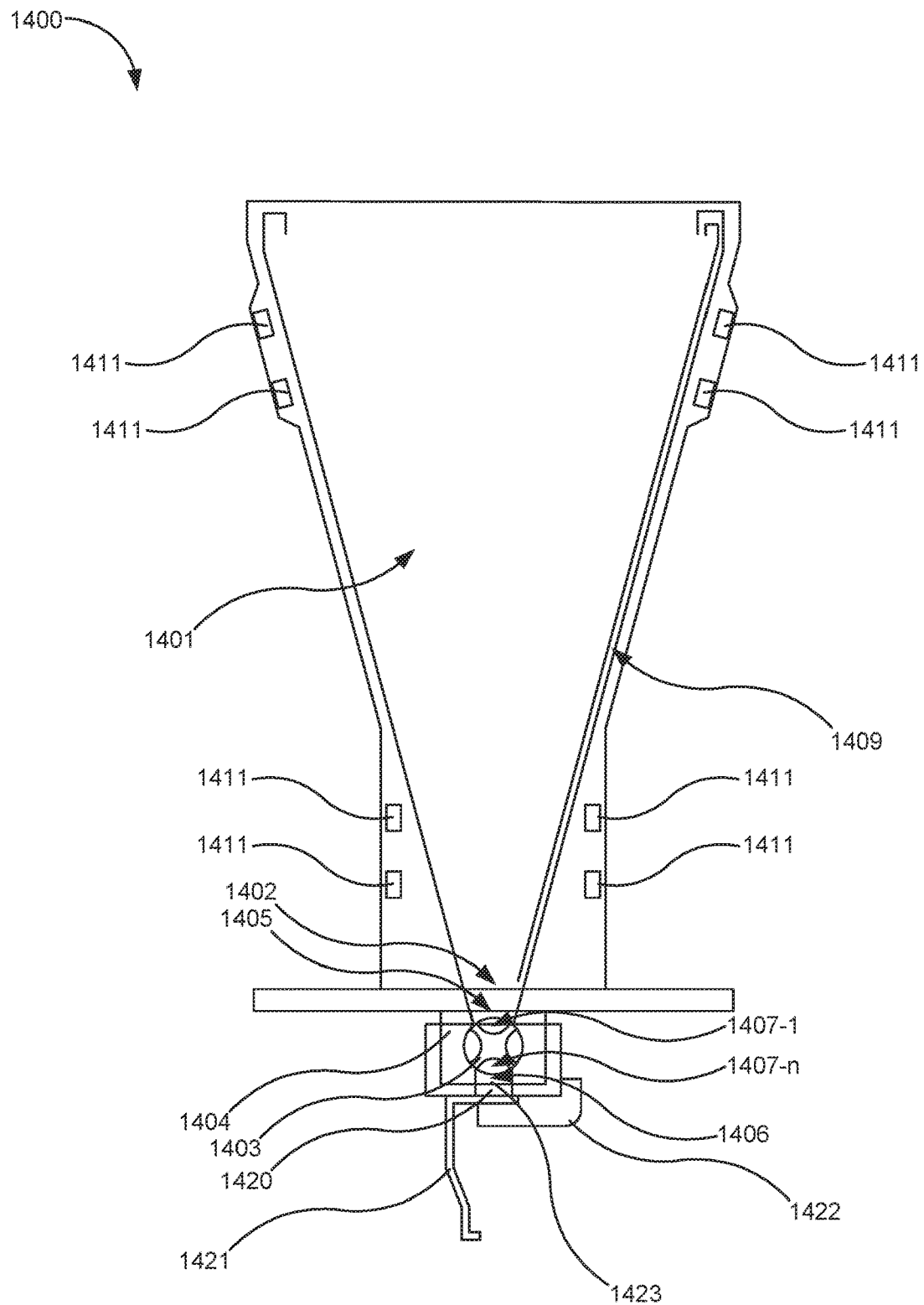
FIG. 14 is a diagram of a build material refill station to refill the hopper of FIG. 13, according to an example of the principles described herein.
Figure 15:
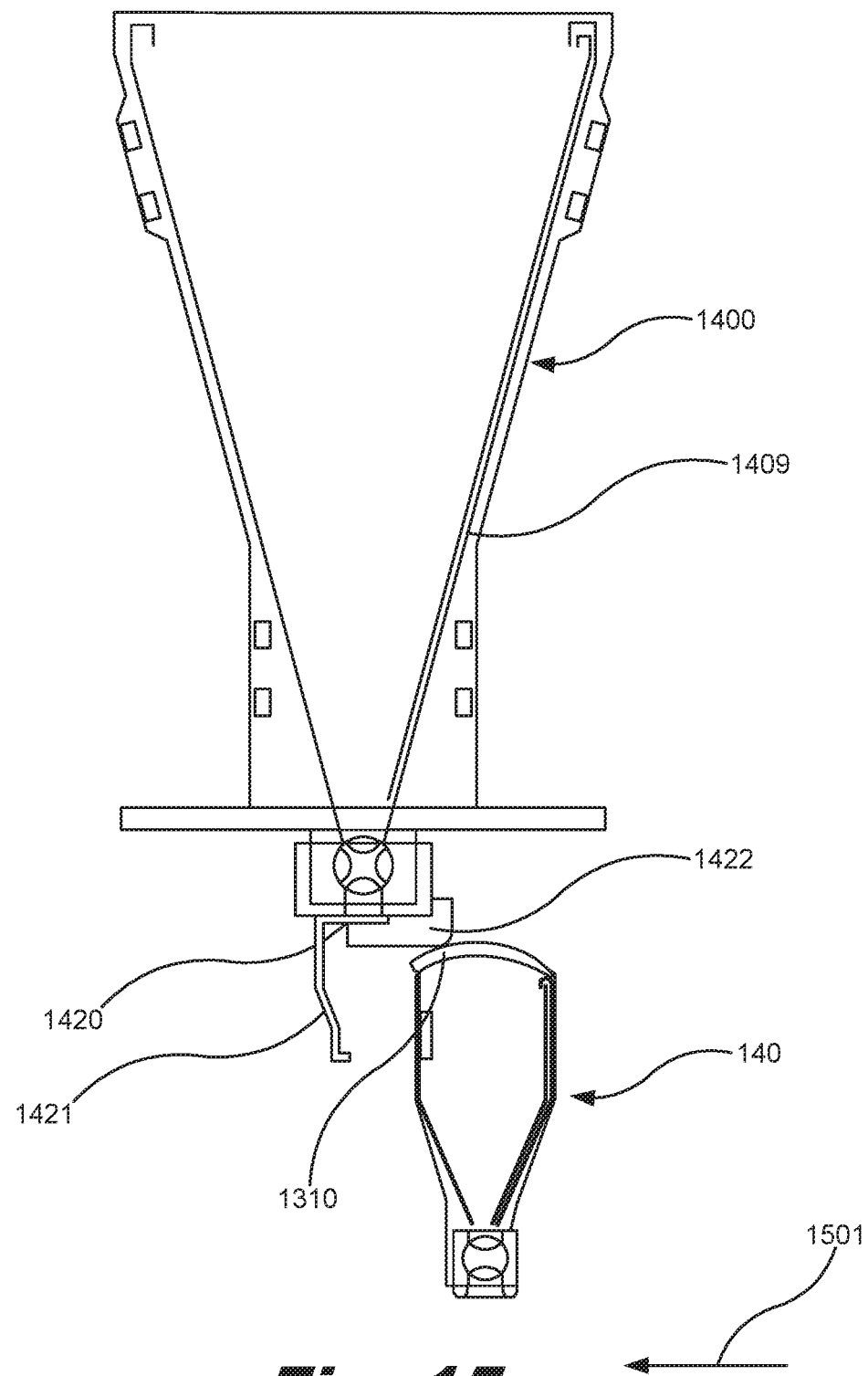
FIG. 15 is a diagram of the hopper of FIG. 13 and the build material refill station of FIG. 14, according to an example of the principles described herein.

As is described in more detail herein in connection with FIGS. 13 through 15, the hoppers (140) may include a plurality of doctor blades coupled to a dispense end of the hoppers (140). The doctor blades serve to assist in the spreading the build material (150) dispensed on the stage (204) and the build platform (202). In one example, the doctor blades may serve as the build material spreader, and the additive manufacturing system (200) may not include a rotating material spreader (120) as depicted in FIGS. 3 through 12. In another example, however, the additive manufacturing system (200) may include both the material spreader (120) as depicted in FIGS. 3 through 12 and the doctor blades.

Turning again to the hoppers (140) of FIGS. 1 through 12, the first hopper (140-1) and the second hopper (140-2) may dispense the build material (150) in front of and behind the material spreader (120) in at least one direction of travel, and, in some examples, may dispense build material (150) in both the positive and negative x-directions of travel as indicated by arrow (190). This allows the hoppers (140) to dispense build material (150) during any pass of the material dispensing device (100) over the build platform (202) bidirectionally, and may reduce the number of passes over the build platform (202) reducing the time per layer of material that it takes to build the 3D object. Further, less passes over the build platform (202) also reduces or eliminates fluctuations in temperature of the build material (150) and successive layers of fused build material that form the 3D object.

With reference to FIGS. 3 through 12, a description of the functioning of the additive manufacturing system (200) will now be described. The state of the additive manufacturing system (200) depicted in FIG. 3 may be an initial state before a first layer of build material (150) is deposited on the stage (204) and build platform (202) or between deposition and binding of successive layers of the build material (150).

Figure 4:
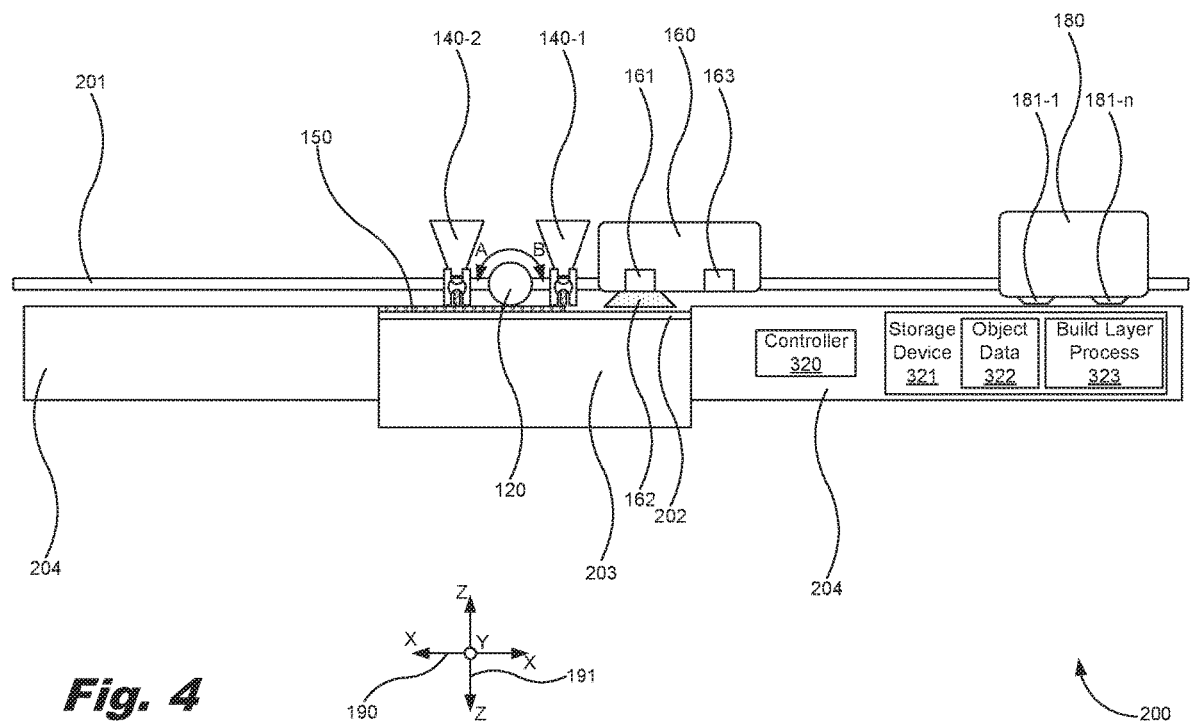

FIG. 4 depicts the additive manufacturing system (200) in a state in which the build material (150) is deposited on the build platform (202). The build platform (202) and build platform base (203) may be moved downward in the z-direction as indicated by arrow (191) to provide for the layer of build material (150) to be formed on the build platform (202), and, in one example, to approximately the level of the stage (204). During the state depicted in FIG. 4, the warming lamp (161) may be actuated and its warming electromagnetic radiation (162) may be used to warm the build platform (202) and the environment around the build platform (202) to assist in maintaining the build material (150) at a more consistent temperature. At this state, the fusing lamp (163) and its fusing electromagnetic radiation (164) may not be activated since an agent has not been dispensed on the layer of build material (150).

It is noted that in FIG. 4, the first hopper (140-1) and the second hopper (140-2) both dispense build material (150) in front of and behind the material spreader (120), respectively. In these examples, the This allows for additional amounts or doses of the build material (150) to be made available to the material spreader (120) for spreading across the build platform (202), and maintains a constant amount of build material (150) in front of the material spreader (120) during any and all passes of the material dispensing device (100). As described herein, in instances where a hopper (140) dispenses build material (150) behind the material spreader (120) relative to the direction of travel of the material spreader (120) along arrow (190), a subsequent pass of the material spreader (120) over the build platform (202) may be made to ensure that a uniformly smooth and even layer of build material is deposited and formed on the build platform (202). Allowing both the first hopper (140-1) and the second hopper (140-2) to dispense building material (150) in both directions of travel enables accurate control of the amount of build material (150) spread in both directions of travel of the material dispensing device (100). Further, the ability of the first hopper (140-1) and the second hopper (140-2) to dispense building material (150) allows for maintaining building material (150) spread dynamics such as even spreading of the build material (150) throughout a spread process. The inclusion of hoppers (140) on either side of the material spreader (120) improves system productivity due to a reduced number of passes over the build platform (202) used to spread the build material (150) bidirectionally. Bidirectional spreading reduces the risk of the 3D object shifting with respect to the build platform (202), and may improve build material spread quality. Dispensing from hoppers (140) simultaneously while the carriage (201) translates across the build platform (202) in either direction may help maintain build temperature uniformity as the build material (150) spread from the rear hopper will insulate the previous layer. In one example, the forward hopper, with respect to the direction of travel of the material dispensing device (100), may dispense bidirectionally without the rear hopper dispensing at the same time or during the same pass over the build platform (202).

Figure 5:
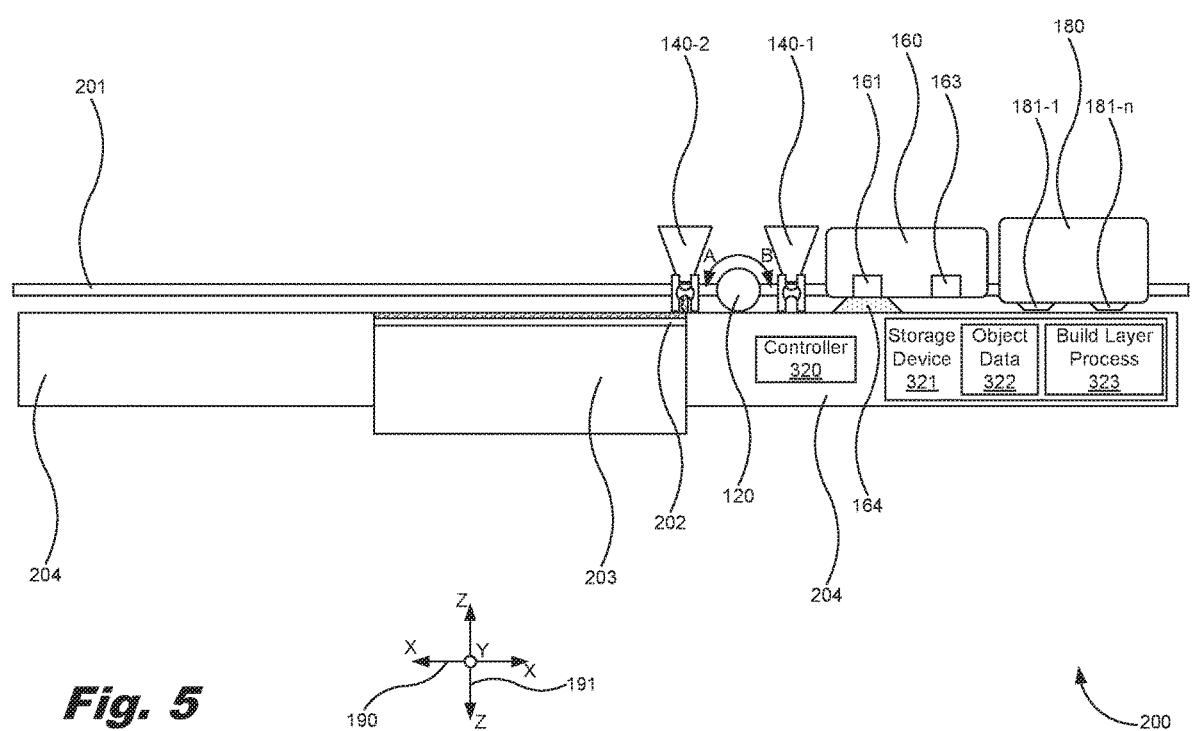

In FIG. 5, the additive manufacturing system (200) may be in a state where the material dispensing device (100) has completed a first build material (150) dispensing pass along with a simultaneous first warming pass. In one example, the warming lamp (161) and its warming electromagnetic radiation (162) may continue to warm the stage (204) and any build material (150) dispensed thereon in preparation of a second dispensing and spreading pass. Further, the carriage (201) may, at this point, cause the material spreader (120) to lift up in the positive z-direction as indicated by arrow (191) as it passes the edge of the build platform (202) from left to right so that any build material (150) dispensed by the hopper (140-1) may not be further spread across the right side of the stage (204). In this manner, the material spreader (120) may skip over any build material (150) dispensed by the hopper (140-1), and spread that build material (150) dispensed by the hopper (140-1) during the next pass from the right to the left over the build platform (202). Doing this will allow the additive manufacturing system (200) to conserve build material (150) and not create a situation where excess build material (150) is moved to unusable portions of the additive manufacturing system (200) such as along the surface of the stage (204) past the effective reach of the material spreader (120) or the doctor blades of the hoppers (140).

Figure 6:
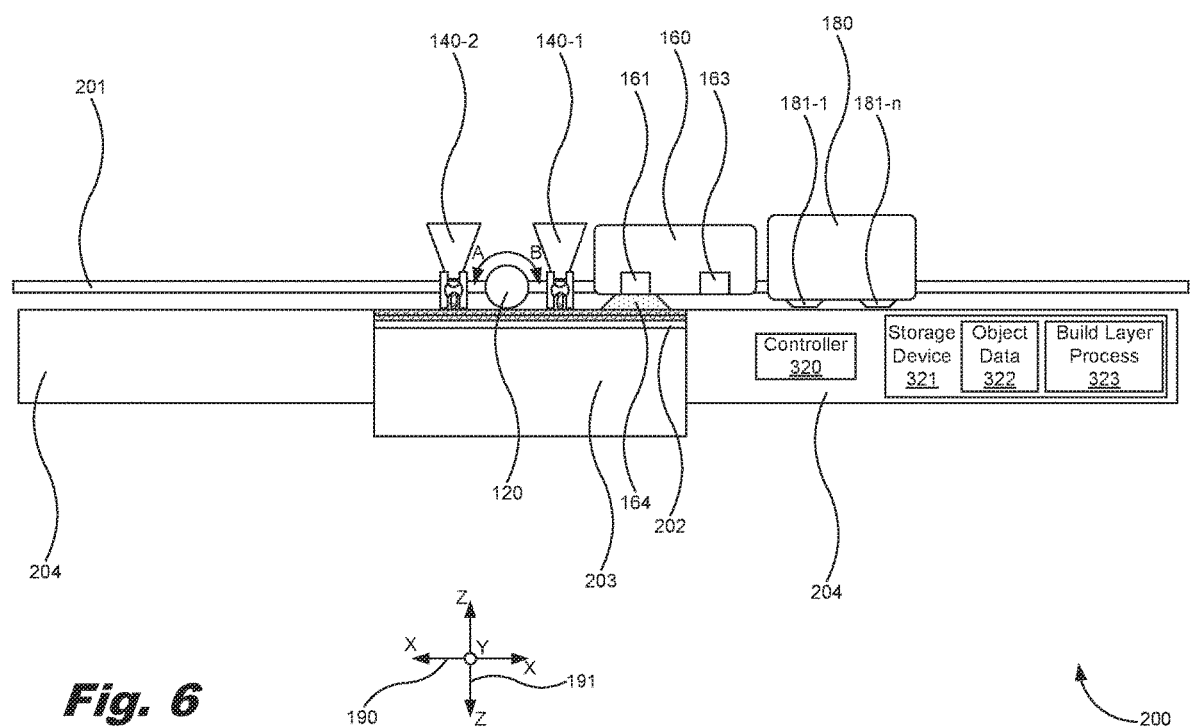

Thus, in FIG. 6, the second pass of building material (150) is depicted including additional build material (150) being dispensed by the first hopper (140-1) and the second hopper (140-2) behind and in front of the material spreader (120), respectfully. In this example, if build material is dispensed by the first hopper (140-1) as it travels from the right to the left behind the material spreader (120) as depicted in FIG. 6, an additional pass of the material spreader (120) may be made. Dispensing from hopper (140-1) in this example, may risk build material (150) contacting with the fluidic die (181) of the agent dispenser (180). While spreading build material (150) without printing agent onto the build material (150), the build material (150) may be dispensed from both hoppers (140-1, 140-2) in order to speed up the dispense process. To ensure that a uniform layer of the build material (150) is laid out on the build platform (202) and to ensure that the agent dispenser (180) is not effected by non-uniform layers of the build material (150), an additional pass of the material spreader (120) may be made.

In another example, during the second pass, hopper (140-2) may dispense build material (150) as the agent dispenser (180) is following without the first hopper (140-1) dispensing build material (150). The material spreader (120) in this pass is rotating in the direction of arrow B so that it counter-rotates relative to the direction of travel of the material dispensing device (100).

The warming lamp (161) may remain on during this second pass to heat the build material (150) already dispensed and the build material (150) that is dispensed in this second pass. Again, the material spreader (120) rotates in the direction of arrow B so that it is counter-rotating with respect to the direction of travel from the right to the left.

Figure 7:
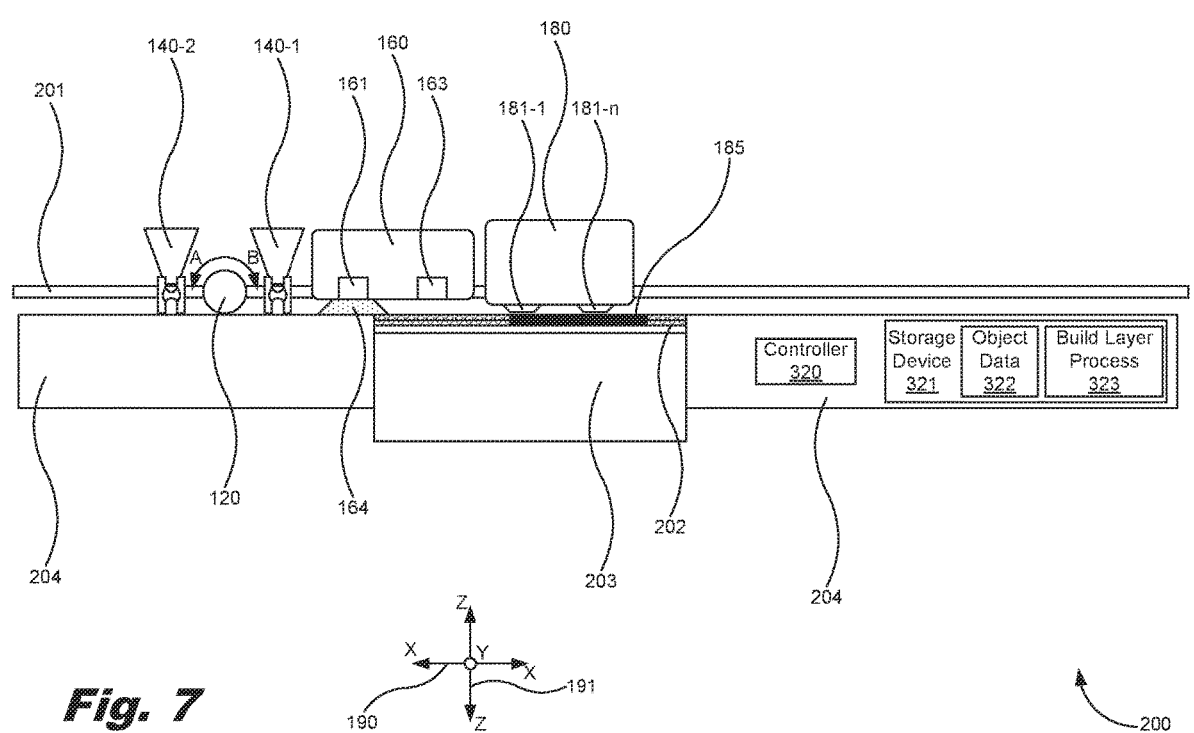

In FIG. 6, the agent dispenser (180) begins to move from its home position to the right of the build platform (202), in the left direction along with the energy emitting device (160) and the build material dispensing device (100) in preparation for dispensing an amount of agent (185) onto the twice dispensed and spread build material (150) on the build platform (202). In FIG. 7, the agent dispenser (180) dispenses the agent (185) in a pattern onto the building material (150) in its first pass over the build platform (202) and second pass of the energy emitting device (160) and the build material dispensing device (100) over the build platform (202).

Figure 8:
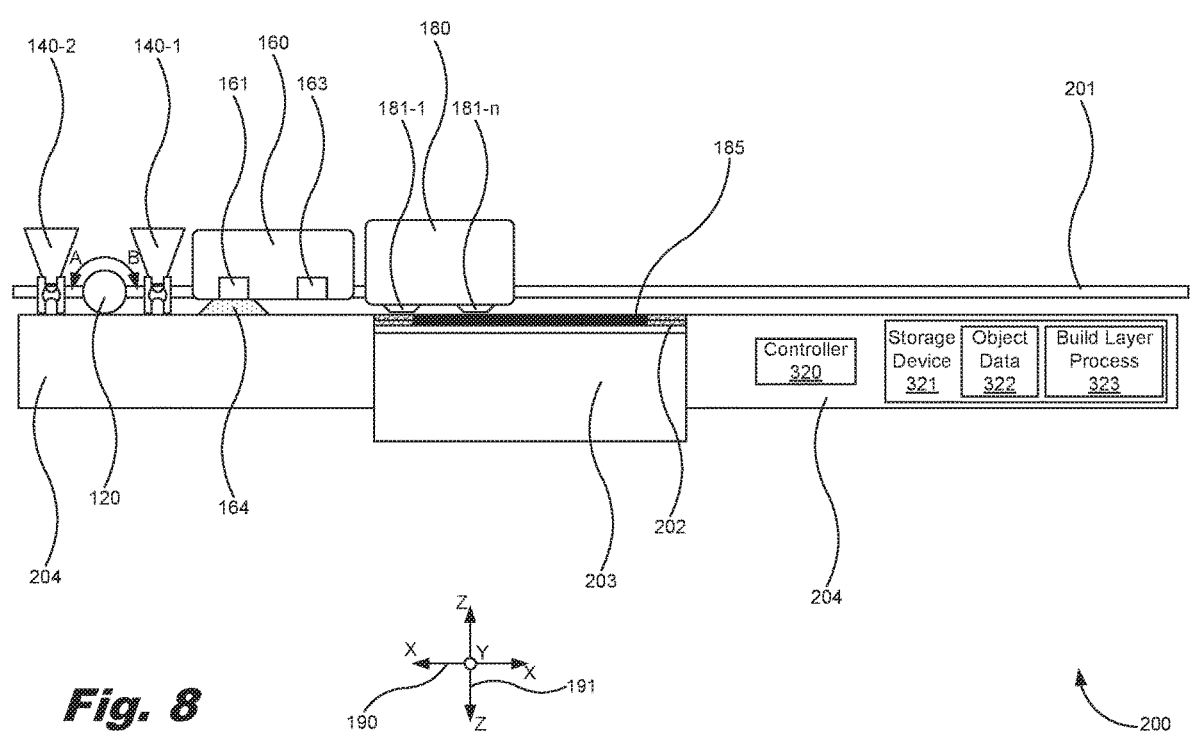

In FIG. 8, the agent dispenser (180) completes its first pass over the build platform (202) while dispensing the agent (185), and begins a second pass over the build platform (202) to dispense another amount of the agent (185). The deposition of the agent (185) during this second pass of the agent dispenser (180) may or may not be performed during the first pass of the agent dispenser (180) and its deposition of the agent (185) during that first pass may be sufficient in some examples. However, in another example, the agent dispenser (180) dispenses agent (185) during both of its passes over the build platform (202). In one example, the agent dispenser (180) dispenses the agent (185) within a target area of the build platform (202) that is smaller than the full length and width of the build platform (202).

Figure 9:
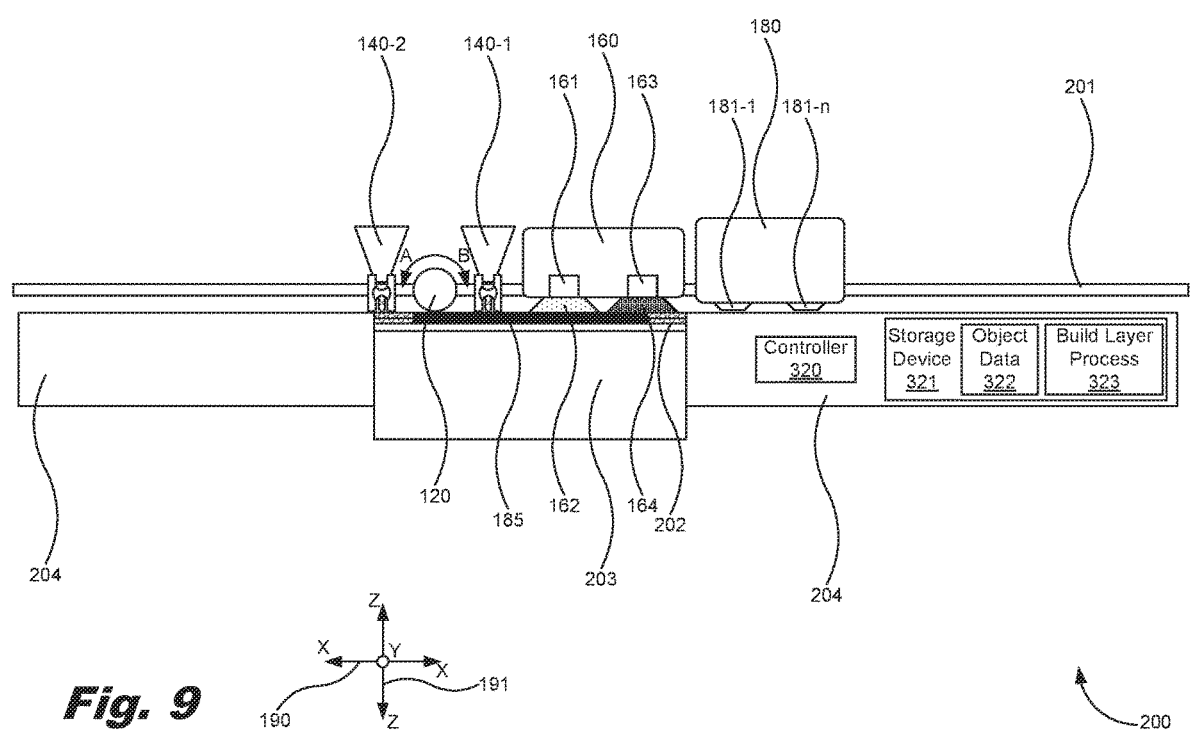

In FIG. 9, as the agent dispenser (180) completes its second pass over the build platform (202), the fusing lamp (163) may be activated to cause its fusing electromagnetic radiation (164) to fuse or bind or cure the build material (150) together through the use of the agent (185). As described herein, the fusing lamps (163) may be activated over a plurality of passes when fusing is not taking place, and may be provided a lower voltage instead. In these examples, the activation of the fusing lamps (163) may refer to a use of the fusing lamps (163) at a sufficient voltage to fuse, bind, or cure the build material (150). While the agent dispenser (180) completes its second pass and the fusing lamp (163) is activated, the hoppers (140) may dispense an amount of build material (150) and the material spreader (120) may spread that deposited build material (150). However, since the fusing lamp (163) may be activated in a subsequent pass back to the left, in another example the hoppers (140) may not dispense build material (150) and the material spreader (120) may not activate in this third pass. In one example, the carriage (201) may lift the material spreader (120) so that it does not contact the build material (150). Further, the energy emitting device (160) may also activate its warming lamp (161) to emit its warming electromagnetic radiation (162) to keep the build material (150), fused layers of the 3D object, and the surrounding environment at a consistent temperature.

Figure 10:
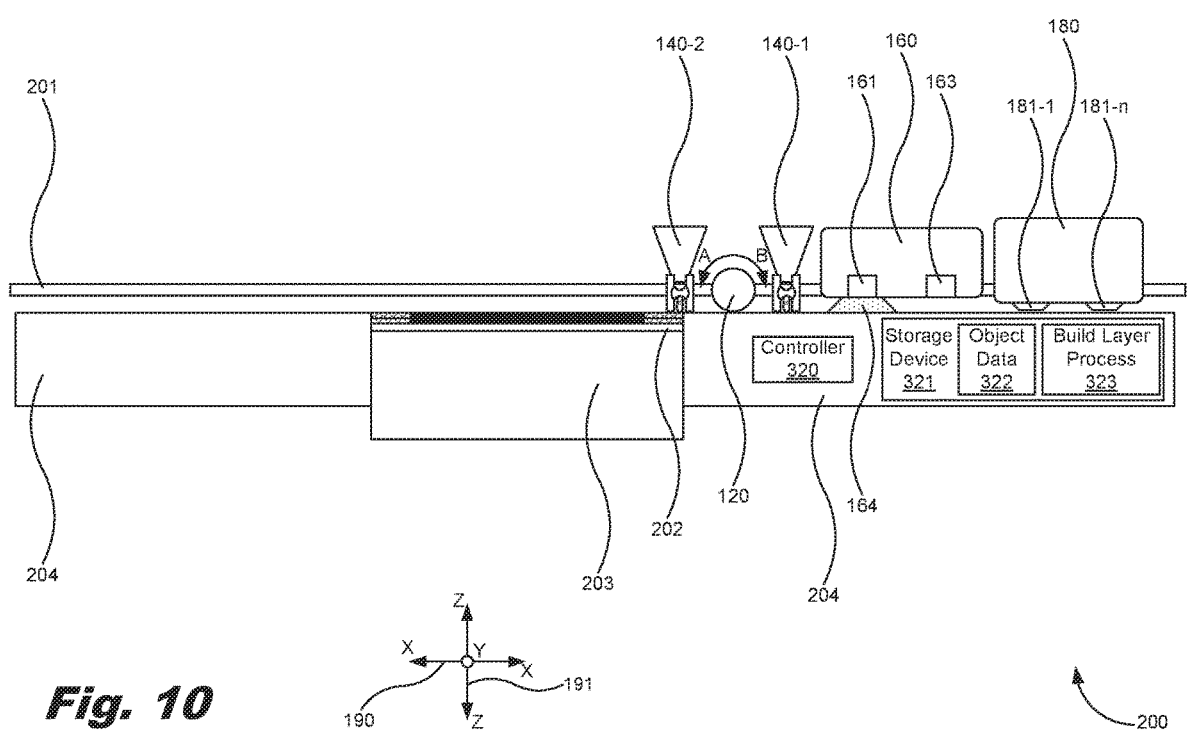

At FIG. 10, the material dispensing device (100), the energy emitting device (160), and the agent dispenser (180) return to the right of the build platform (202) completing its third pass. At this point, the agent dispenser (180) is left on the right side of the build platform (202), and the material dispensing device (100) and energy emitting device (160) make a fourth pass over the build platform (202), As the material dispensing device (100) and energy emitting device (160) make this fourth pass as depicted in FIG. 11, the fusing lamp (163) may be again activated during this fourth pass to again cause its fusing electromagnetic radiation (164) to fuse or bind or cure the build material (150) together through the use of the agent (185). This second fusing or binding pass may assist in ensuring that the entirety of the build material (150) that is exposed to the agent (185) is fused.

Figure 3:
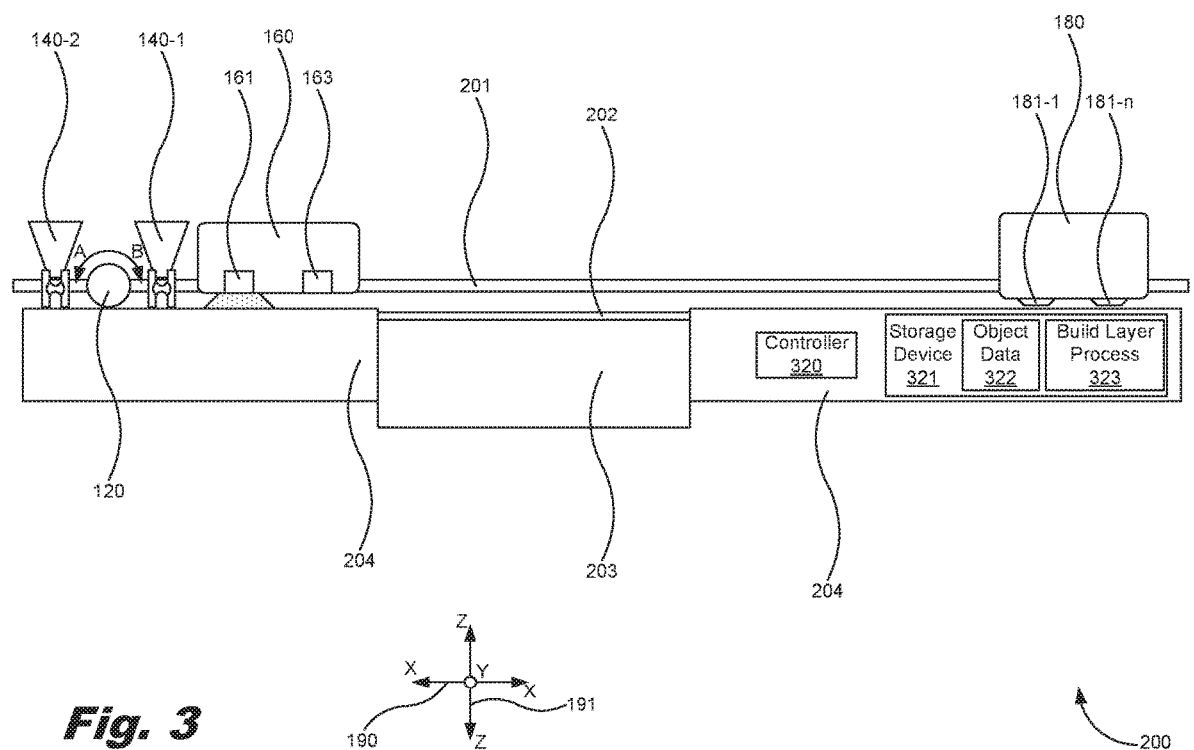
FIGS. 3 through 12 are block diagrams of an additive manufacturing system depicting a process performed by the additive manufacturing system, according to an example of the principles described herein.

At FIG. 12, the material dispensing device (100) and energy emitting device (160) return back to the initial position they were in as depicted in FIG. 3. The process of FIGS. 3 through 12 may be performed any number of iterations in order to form a 3D object. Thus, when the process begins at FIG. 3 again, the fusing lamp (163) may be again activated for a third time during this subsequent first pass to again cause its fusing electromagnetic radiation (164) to fuse or bind the build material (150) together through the use of the agent (185).

The process of FIGS. 3 through 12 may include a number of processes using the material spreader (120), the hoppers (140), energy emitting device (160), and the agent dispenser (180) and may include a number of sub-processes effected by these devices. Thus, the first pass may include a fusing process using the fusing lamp (163) to fuse build material (150) from a previous layer formation for a third time. This first pass may also include a warming process using the warming lamp (161), and a build material (150) deposition and spreading process using the material spreader (120) and hoppers (140) of the material dispensing device (100).

The second pass may include a second build material (150) deposition and spreading process, a second warming process, and a first agent (185) dispensing process using the agent dispenser (180). The third pass may include a second agent (185) dispensing process, a second fusing process using the fusing lamp (163), and a third warming process using the warming lamp (161). The fourth pass may include a fourth warming process using the warming lamp (161) and a third fusing process. In this manner, a single layer of the 3D object may be formed, and the process may be performed a number of times to form subsequent layers of the 3D object. Between instantiations of this four-pass process, the build platform (202) may move down with respect to arrow (191) to accommodate for the layers of build material (150) added and fused within the 3D object.

FIG. 13 is a diagram of a hopper (140) to dispense a build material (150) onto a build platform (202) of an additive manufacturing system (200), according to an example of the principles described herein. The hopper (140) may include a material storage area (1301) to store the build material (150), The material storage area (1301) may include a storage area outlet (1302) to allow the build material (150) contained in the material storage area (1301) to exit the material storage area (1301). The hopper (140) may also include a rotary doser (1303) rotatably coupled to a manifold (1304). The manifold (1304) may include a manifold inlet (1305) and a manifold outlet (1306) to allow build material to enter and exit the rotary doser (1303).

The rotary doser (1303) may include a number of doser voids (1307-1, 1307-n, collectively referred to herein as 1307), and may rotate in either direction or both directions to dispense build material (150). The doser voids (1307) may serve to contain an amount of build material (150) that is dispensed to the rotary doser (1303) from the material storage area (1301) through the storage area outlet (1302) and the manifold inlet (1305). The doser voids (1307) may be shaped to contain a measured amount of the build material so that when the rotary doser (1303) rotates and dispenses the build material (150) through the manifold outlet (1306) when it is rotated to the bottom of the hopper (140), a known amount of build material (150) is dispensed onto the stage (204) and/or the build platform (202). The speed at which the rotary doser is rotated may be varied, or changed, to modify the rate at which build material is dispensed from the hopper (140).

The hopper (140) may also include a number of doctor blades (1308-1, 1308-2, collectively referred to herein as 1308) coupled to the bottom of the manifold (1304), The doctor blades (1308) may be used to assist the spreading the build material (150) dispensed on the stage (204) and the build platform (202). In one example, the doctor blades (1308) may serve as the build material spreader, and the additive manufacturing system (200) may not include the rotating material spreader (120) as depicted in FIGS. 3 through 12. In another example, however, the additive manufacturing system (200) may include both the material spreader (120) as depicted in FIGS. 3 through 12 and the doctor blades (1308). In one example, a doctor blade (1308) may be included on a front and back side of the manifold (1304) relative to a direction of travel along the carriage (201) to allow for a doctor blade (1308) to always be able to spread the build material out in front of the direction of movement of the hopper (140) whether the direction of travel is to the right or to the left as depicted in FIGS. 3 through 12.

The hopper (140) may also include an air vent (1309) used to vent air into the material storage area (1301). In some examples, the material storage area (1301) may be sealed such that air may not be able to pass into the material storage area (1301) when material is dispensed therefrom. Thus, in order to allow the build material (150) to exit the hopper (140), the air vent (1309) allows for air to replace the dispensed build material (150) and relieve any pressure that may otherwise exist in the material storage area (1301).

In one example, the hoppers (140) of the additive manufacturing system (200) may also include a number of heating elements (1311) to heat the build material (150) therein. Pre-heating the build material (150) helps to ensure that the formed layers of the 3D object do not warp.

Further, the hopper (140) may include a door (1310) that may be opened to access the material storage area (1301). This door may be used to refill the material storage area (1301) with build material (150). FIG. 14 is a diagram of a build material refill station (1400) to refill the hopper (140) of FIG. 13, according to an example of the principles described herein. Further, FIG. 15 is a diagram of the hopper (140) of FIG. 13 and the build material refill station (1400) of FIG. 14, according to an example of the principles described herein. The build material refill station (1400) may include a material storage area (1401) to store the build material (150) in preparation to dispense that build material (150) in to the hopper. The material storage area (1401) may include a storage area outlet (1402) to allow the build material (150) contained in the material storage area (1401) to exit the material storage area (1401). The build material refill station (1400) may also include a rotary doser (1403) rotatably coupled to a manifold (1404). The manifold (1403) may include a manifold inlet (1405) and a manifold outlet (1406) to allow build material (150) to enter and exit the rotary doser (1403).

The rotary doser (1403) may include a number of doser voids (1407-1, 1407-n, collectively referred to herein as 1407), and may rotate in either direction or both directions to dispense build material (150), The doser voids (1407) may serve to contain an amount of build material (150) that is dispensed to the rotary doser (1403) from the material storage area (1401) through the storage area outlet (1402) and the manifold inlet (1405). The doser voids (1407) may be shaped to contain a measured amount of the build material so that when the rotary doser (1403) rotates and dispenses the build material (150) through the manifold outlet (1406) when it is rotated to the bottom of the build material refill station (1400), a known amount of build material (150) is dispensed into the hopper (140) that the build material refill station (1400) is refilling.

The build material refill station (1400) may also include an air vent (1409) used to vent air into the material storage area (1301), In some examples, the material storage area (1401) may be sealed such that air may not be able to pass into the material storage area (1401) when material is dispensed therefrom. Thus, in order to allow the build material (150) to exit the build material refill station (1400), the air vent (1409) allows for air to replace the dispensed build material (150) and relieve any pressure that may otherwise exist in the material storage area (1401).

In one example, the build material refill station (1400) of the additive manufacturing system (200) may also include a number of heating elements (1411) to heat the build material (150) therein. Pre-heating the build material (150) helps to ensure that the formed layers of the 3D object do not warp.

In one example, the build material refill station (1400) may include a pre-stage area (1423) located at the manifold outlet (1406). When the rotary doser (1403) rotates within the manifold (1404), the build material (150) contained within the doser voids (1407) may fall into the pre-stage area (1423) above the closed dispense door (1420) waiting for the dispense lever (1421) to be actuated to allow that portion of build material (150) in the pre-stage area (1423) to be dispensed from the pre-stage area (1423) and the manifold outlet (1406) into the hoppers (140).

The build material refill station (1400) may also include a dispense door (1420) pivotably coupled to the manifold (1404). A dispense lever (1421) is coupled to the dispense door (1420) such that when a force is applied to the dispense lever (1421), the dispense door (1420) opens, and the build material contained in the doser void (1407) closest to the dispense door (1420) may be dispensed into the hopper (140). The manifold (1404) may include a catch (1422) coupled thereto that interfaces with the door (1310) of the hopper (140), and forces the door (1310) open in the direction of arrow (FIG. 13, 1330) as the hopper (140) is moved in the direction of arrow (1501). Thus, as the hopper (140) is moved in the direction of arrow (1501), the door (1310) interfaces with the catch (1422) and the door is forced open. As the hopper (140) is further moved in the direction of arrow (1501) with the door (1310) open, the dispense lever (1421) interfaces with a surface of the hopper (140) causing the dispense door (1420) to pivot open and dispense build material (150) from the doser void (1407) closest to the dispense door (1420). In this manner, the hopper (140) may be refilled.

In one example, the amount of build material (150) contained in a doser void (1407) may not be enough to completely fill the hopper (140). In this example, the build material refill station (1400) may be placed to the left of the build platform (202) as depicted in FIGS. 3 through 12. In this orientation, the hoppers (140) may interface with the build material refill station (1400) when they move from the right to the left during any one of their return passes over the build platform (202). This allows the hoppers (140) to receive a smaller amount of build material (150) from the build material refill station (1400) as the hoppers (140) themselves dispense build material (150) much like "taking a sip" of build material (150) from the build material refill station (1400) rather than refiling entirely each time. By allowing the hoppers (140) to be refiled using relatively small amounts, the hoppers (140) do not become too heavy to move along the carriage (201), and can dispense their build material (150) without any strain on mechanical elements of the carriage (201) effecting the manner in which the hoppers (140) dispense the build material (150).

In one example, a single build material refill station (1400) may be used to refill both hoppers (140-1, 140-2) in the additive manufacturing system (200). In this example, the second hopper (140-2) may first receive build material (150) from the build material refill station (1400), and push past the dispense lever (1421) to allow the first hopper (140-1) to then interface with the dispense lever (1421). Further, in this example, the dispense lever (1421) may be resilient enough to cause the dispense door (1420) to open, but elastic enough to allow the second hopper (140-2) to push past it, or it may be hinged such that the dispense lever (1421) may turn a full 90 degrees to allow the second hopper (140-2) to push past it. In another example, the additive manufacturing system (200) may include two build material refill stations (1400) to allow the two hoppers (140-1, 140-2) to be refilled.

Figure 16:
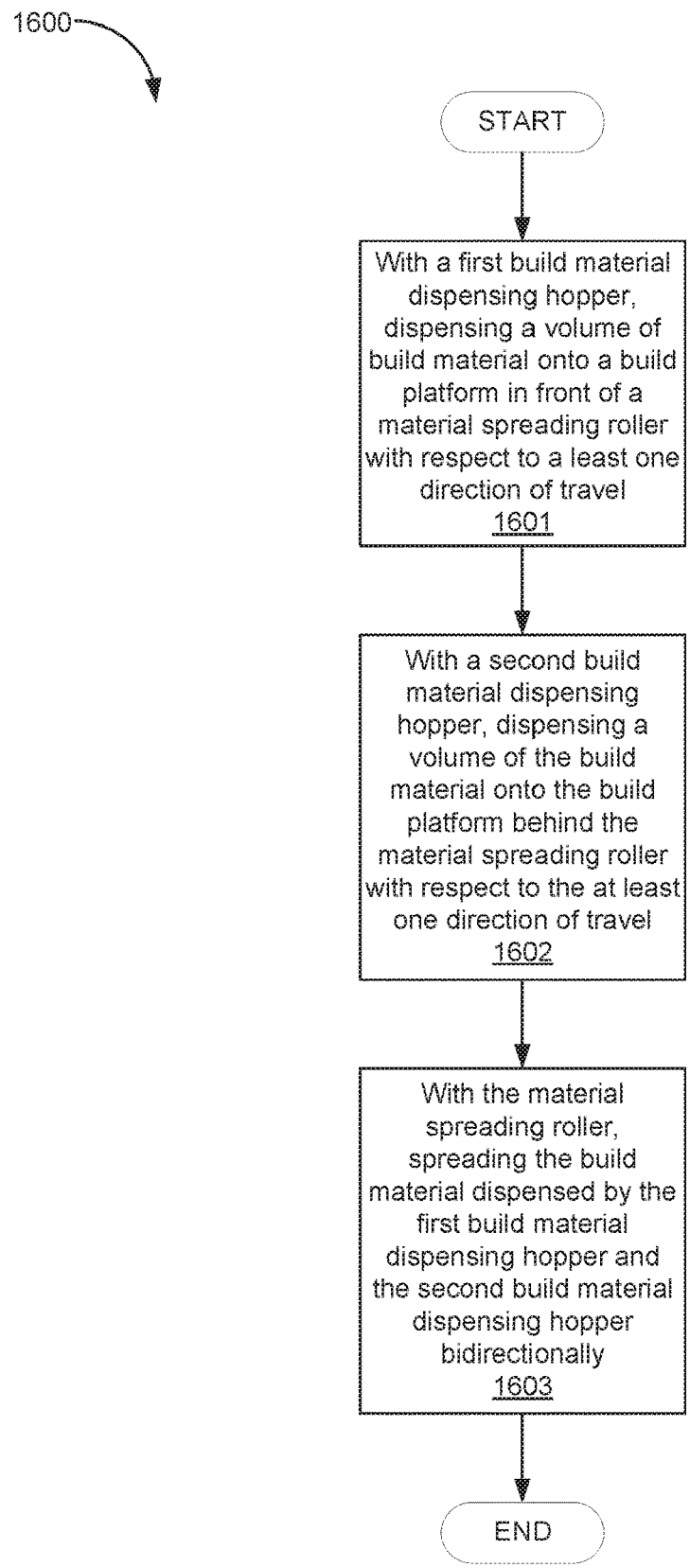
FIG. 16 is a flowchart depicting a method of supplying build material to an additive manufacturing system, according to an example of the principles described herein.

FIG. 16 is a flowchart depicting a method (1600) of supplying build material (150) to an additive manufacturing system (200), according to an example of the principles described herein. The method (1600) may include, with a first build material dispensing hopper (140-1), dispensing (block 1601) a volume of build material (150) onto the build platform (202) in front of the material spreading roller (120) with respect to a least one direction of travel as indicated by arrow (190) in FIGS. 1 through 12. In one example, the first hopper (140-1) may dispense any number of doses or any amount of build material (150) along a pass over the build platform (202) including a plurality of doses of the build material (150), The method (1600) may further include, with the second build material dispensing hopper (140-2), dispensing (block 1602) a volume of the build material (150) onto the build platform (202) behind the material spreading roller (120) with respect to the a least one direction of travel. This allows for additional build material (150) to be spread across the build platform (202) in subsequent passes over the build platform (202) which results in a more uniform spreading of build material (150). The material spreading roller (120), spreading (block 1603) the build material (150) dispensed by the first build material dispensing hopper (140-1) and the second build material dispensing hopper (140-2) bidirectionally. Further, in one example, the first hopper (140-1) and the second hopper (140-2) may dispense build material (150) simultaneously.

In this manner, the spreading of the build material (150) over the build platform (202) may be more effective and efficient as fewer passes are used to appropriately spread the build material (150) over the build platform (202). Because the material spreader (120) rotates in two directions, and counter-rotates with respect to its direction of travel, the material spreader (120) may effectively utilize the build material (150) dispensed by both hoppers (140-1, 140-2) to completely and uniformly cover the build platform (202) in preparation for a dispensing of agent from the agent dispenser (180) and a fusing process from a fusing lamp (163) of the energy emitting device (160).

Figure 17:
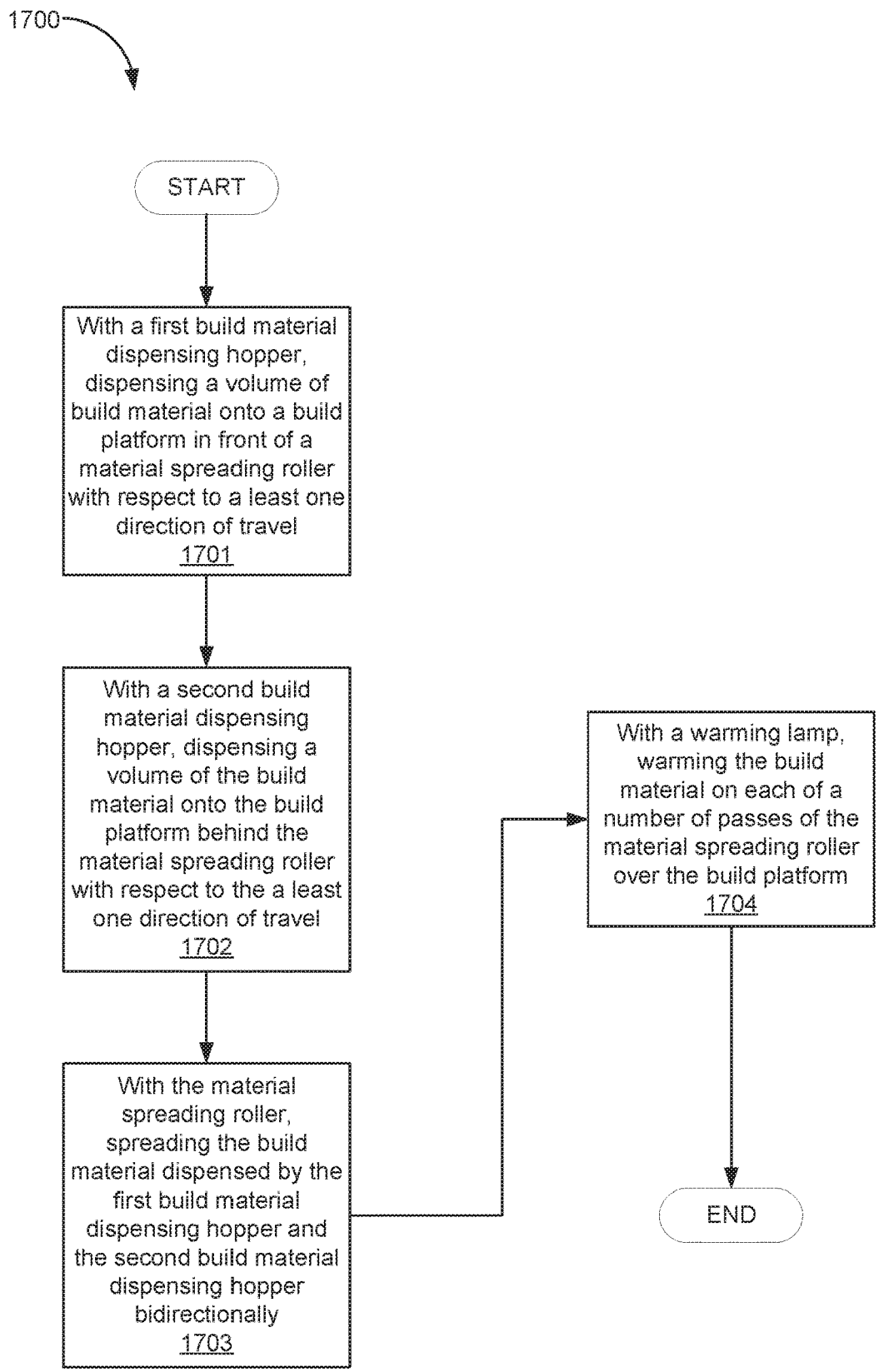
FIG. 17 is a flowchart depicting a method of supplying build material to an additive manufacturing system, according to another example of the principles described herein.

FIG. 17 is a flowchart depicting a method (1700) of supplying build material (150) to an additive manufacturing system (200), according to another example of the principles described herein. Blocks 1701 through 1703 of FIG. 17 are identical to blocks 1601 through 1603 of FIG. 16, and their description is provided above in connection with FIG. 16. The method of FIG. 17 may further include, with a warming lamp (161) of the energy emitting device (160), warming the build material (150) on each of a number of passes of the material spreading roller (120) over the build platform (202). By regularly warming the build material (150) with the warming lamp (161), the build material (150), fused portions of the build material, and the environment therearound may be maintained at a consistent temperature. Maintaining a consistent temperature among the elements involved in forming the 3D object ensures that the 3D object is not subjected to temperature fluctuations that may cause layers of the 3D object to warp or become distorted.

In the examples described herein, the hoppers (140) and the material spreader (120) may be coupled to separate carriages (201). In this example, the hoppers (140) may dispense volumes of build material (150) at different locations on the build platform (202) for spreading by the material spreader (120). The hoppers (140) in this example may move independently of the material spreader (120), and dose build material (150) at any location and at any time that allows for the most effective use of the build material (150) by the material spreader (120).

The specification and figures describe a build material dispensing device in an additive manufacturing system. The build material dispensing device may include a material spreader to spread an amount of build material along a build platform, and at least one hopper for dispensing the build material. The at least one hopper dispenses a plurality of doses of the build material in front of the progression of the material spreader as the material spreader is moved over the build platform. The build material dispensing device may maintain a consistent amount of build material in front of the material spreader during each pass of the build material dispensing device over a build platform, and provides for the dispensing of a number of doses or any amount of build material to maintain build material spread dynamics throughout the spread process. Further, the build material dispensing device provides for the accurate control of the amount of build material spread in either direction of travel of the build material dispensing device along a carriage. Further, the build material dispensing device allows for multi-pass dispensing of layers of the build material.

Further, the build material dispensing device enables single pass multi-height spreading of the build material which improves the uniformity of the density of the layers of build material spread along the build platform. Further, the non-aggressive build material transfer provided by the build material dispensing device reduces risk of electrical charging of the build material, which may have unpredictable results. Further, swappable hoppers allow a widened range of materials such as metals to be accurately deposited to the build platform, and each dispenser is tuned for at least one, and in some examples, a plurality of different materials. Further, pre-heating of the build material directly before dispensing to the build platform using heaters in the hoppers and the build material refill station, and during deposition of the build material on the build platform using the warming lamp allows for tightened control of the temperature of the build material and its surrounding environment.

The preceding description has been presented to illustrate and describe examples of the principles described. This description is not intended to be exhaustive or to limit these principles to any precise form disclosed. Many modifications and variations are possible in light of the above teaching.

What is claimed is:

1. A build material dispensing device in an additive manufacturing system, comprising:
   a material spreader to spread an amount of build material along a build platform; and
   a plurality of hoppers for dispensing the build material, wherein each of the plurality of hoppers comprise a door to access a build material storage area,
   wherein the hoppers dispense a plurality of doses of the build material in front of the progression of the material spreader as the material spreader is moved over the build platform.

2. The build material dispensing device of claim 1, wherein the plurality of hoppers comprises:
   a first hopper for dispensing the build material, the first hopper being located in front of the material spreader with respect to a least one direction of travel; and
   a second hopper for dispensing the build material, the second hopper being located behind the material spreader with respect to at least one direction of travel.

3. The build material dispensing device of claim 1, wherein the material spreader comprises a material spreading roller that counter-rotates such that it rotates in a direction opposite to its movement relative to the build platform, wherein a distance between the material spreading roller and the build platform is adjustable within a number of layers of dispensed build material, between the layers of dispensed build material, or combinations thereof.

4. The build material dispensing device of claim 1, comprising a carriage, the carriage moveably coupled to the material spreader and the plurality of hoppers to move the material spreader and the hoppers laterally across the build platform.

5. The build material dispensing device of claim 1, wherein the plurality of hoppers comprise:
   a plurality of doctor blades coupled to a dispense end of the each of the hoppers; and
   a rotary doser comprising a number of metering pockets defined therein to dispense a metered amount of build material as the rotary doser rotates based on instructions received from a controller.

6. The build material dispensing device of claim 2, wherein the first hopper and the second hopper dispense the build material in front of and behind the material spreader in at least one direction of travel.

7. The build material dispensing device of claim 1, wherein the plurality of hoppers comprise a number of heating elements to heat the build material therein.

8. The build material dispensing device of claim 1, wherein each of the plurality of hoppers comprise an air vent to vent air into the build material storage area, the air vent to allow air to replace dispensed build material.

9. The build material dispensing device of claim 1, wherein the door is to seal an opening of the build material storage area.

10. The build material dispensing device of claim 1, wherein the door is to interface with a catch of a build material refill station, the door to open in response to the interface with the catch.

11. The build material dispensing device of claim 1, wherein each of the plurality of hoppers comprise heating elements affixed to side walls of the plurality of hoppers.

12. The build material dispensing device of claim 1, wherein each of the plurality of hoppers comprise:
   a manifold coupled to a storage area outlet; and
   a rotary doser rotatably coupled to the manifold.

13. An additive manufacturing system, comprising:
   a carriage;
   a build material dispensing device coupled to the carriage comprising:
      a material spreader to spread an amount of build material along a surface;
      a first hopper for dispensing the build material, the first hopper being located in front of the material spreader with respect to a least one direction of travel; and
      a second hopper for dispensing the build material, the second hopper being located behind the material spreader with respect to the at least one direction of travel, and
   wherein the first hopper and the second hopper are to dispense the build material bidirectionally in front of the progression of the material spreader, wherein the first hopper and the second hopper each include a lid.

14. The additive manufacturing system of claim 13, wherein the material spreader comprises a material spreading roller that counter-rotates such that it rotates in a direction opposite direction to its movement relative to the surface, wherein a distance between the material spreading roller and the surface is adjustable within a number of layers of dispensed build material, between the layers of dispensed build material, or combinations thereof.

15. The additive manufacturing system of claim 13, comprising an agent dispenser to dispense an agent on the build material as dispensed by the build material dispensing device.

16. The additive manufacturing system of claim 13, wherein the first hopper and the second hopper dispense the build material in front of and behind the material spreader in the at least one direction of travel.

17. The additive manufacturing system of claim 13, wherein the additive manufacturing system comprises:
   at least one hopper refilling system, the at least one hopper refilling system comprising:
      a bulk build material housing;
      a preliminary rotary doser;
      a pre-stage area for storing a volume of the build material as dispensed by the preliminary rotary doser;
      a lid opener coupled to the at least one hopper refilling system around the pre-stage area;
      a transfer chute located below the pre-stage area; and
      a transfer chute lever mechanically coupled to the transfer chute to open the transfer chute when engaged,
   wherein the lid opener opens the lid of the first hopper and the second hopper using the lid opener when the first hopper and the second hopper are moved with the carriage to engage the transfer chute lever, and
   wherein engagement of the transfer chute lever opens the transfer chute to dispense the build material within the pre-stage area into the first hopper and the second hopper.

18. A method of supplying build material to an additive manufacturing system, comprising:
   with a build material refill station, interfacing with a first build material dispensing hopper to open a door of the first build material dispensing hopper and to dispense build material into the first build material dispensing hopper;
   with the build material refill station, interfacing with a second build material dispensing hopper to open a door of the second build material dispensing hopper and to dispense build material into the second build material dispensing hopper;
   with the first build material dispensing hopper, dispensing a volume of build material onto a build platform in front of a material spreading roller with respect to at least one direction of travel during a first pass;
   with the second build material dispensing hopper, dispensing a volume of the build material onto the build platform behind the material spreading roller with respect to the at least one direction of travel during the first pass;
   with the material spreading roller, spreading the build material dispensed by the first build material dispensing hopper and the second build material dispensing hopper bidirectionally.

19. The method of claim 18, comprising, with a warming lamp, warming the build material on each of a number of passes of the material spreading roller over the build platform.

20. The method of claim 18, comprising dispensing build material from the first build material dispensing hopper and the second build material dispensing hopper simultaneously.

* * * * *